United States Patent
Sekiguchi et al.

(10) Patent No.: US 8,872,462 B2
(45) Date of Patent: Oct. 28, 2014

(54) MOTOR CONTROL DEVICE

(75) Inventors: Hiroyuki Sekiguchi, Tokyo (JP); Hidetoshi Ikeda, Tokyo (JP); Takashi Isoda, Tokyo (JP); Shuya Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 13/824,652

(22) PCT Filed: Oct. 7, 2011

(86) PCT No.: PCT/JP2011/073263
§ 371 (c)(1),
(2), (4) Date: Mar. 18, 2013

(87) PCT Pub. No.: WO2012/056868
PCT Pub. Date: May 3, 2012

(65) Prior Publication Data
US 2013/0200835 A1    Aug. 8, 2013

(30) Foreign Application Priority Data
Oct. 27, 2010 (JP) .................................. 2010-241237

(51) Int. Cl.
H02P 1/00 (2006.01)
H02P 5/00 (2006.01)

(52) U.S. Cl.
USPC ........... 318/490; 318/609; 318/610; 318/619; 318/632

(58) Field of Classification Search
USPC .......................... 318/490, 609, 610, 619, 632
See application file for complete search history.

(56) References Cited

U.S. PATENT DOCUMENTS

| | | | |
|---|---|---|---|
| 5,384,676 A * | 1/1995 | Yokoyama et al. | 360/77.13 |
| 6,936,990 B2 * | 8/2005 | Oyama et al. | 318/632 |
| 2011/0077835 A1 * | 3/2011 | Otsuka | 701/99 |
| 2011/0221378 A1 * | 9/2011 | Tazawa et al. | 318/619 |

FOREIGN PATENT DOCUMENTS

| | | |
|---|---|---|
| JP | 62 67675 | 3/1987 |
| JP | 2004 5469 | 1/2004 |
| JP | 2004 303307 | 10/2004 |
| JP | 2005 39954 | 2/2005 |
| JP | 2005 198404 | 7/2005 |

(Continued)

OTHER PUBLICATIONS

International Search Report Issued Dec. 20, 2011 in PCT/JP11/73263 Filed Oct. 7, 2011.

*Primary Examiner* — Paul Ip
(74) *Attorney, Agent, or Firm* — Oblon, Spivak, McClelland, Maier & Neustadt, L.L.P.

(57) ABSTRACT

A motor control device includes a vibration-damping-control setting unit to designate one of a plurality of candidate frequencies of a vibration-damping frequency, a signal-for-estimation computing unit to output, based on an operation signal related to a controlled object, a signal for estimation in which signal components of the other candidate frequencies excluding the designated one candidate frequency are reduced from a vibration component of a control system, and a resonance-characteristic estimating unit to estimate one resonance frequency from the output signal for estimation. The vibration-damping-control setting unit designates each of the candidate frequencies individually as one candidate frequency and sets, in a feedforward control unit, each of resonance frequencies estimated by the resonance-characteristic estimating unit related to the individually designated each one candidate frequency.

7 Claims, 13 Drawing Sheets

(56) References Cited

FOREIGN PATENT DOCUMENTS

| JP | 2005 278349 | 10/2005 |
| JP | 2005 304120 | 10/2005 |
| JP | 2009 48462 | 3/2009 |
| JP | 2009 296746 | 12/2009 |

* cited by examiner

TIME [sec](20ms/div)

TIME [sec](20ms/div)

TIME [sec](20ms/div)

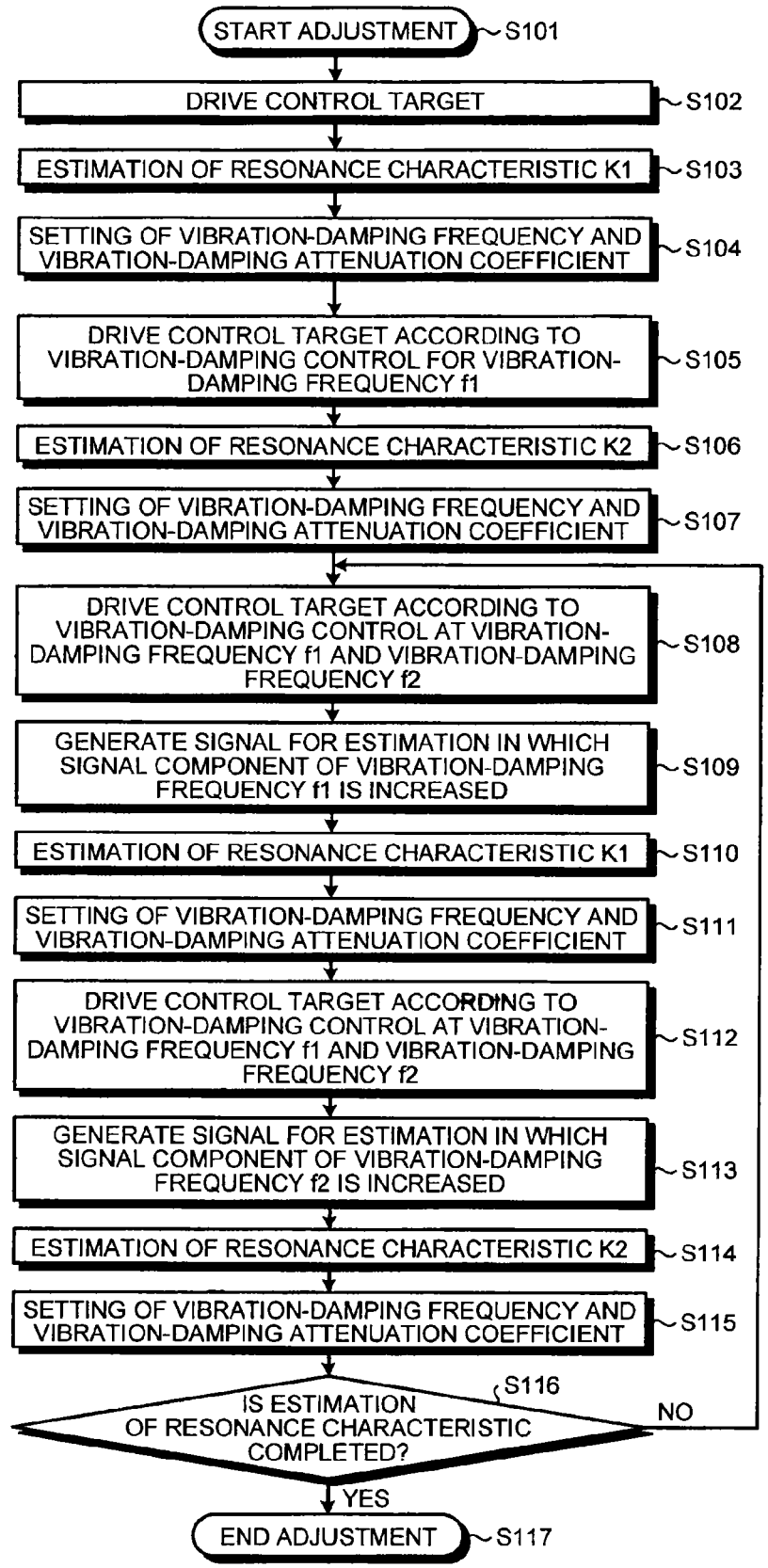

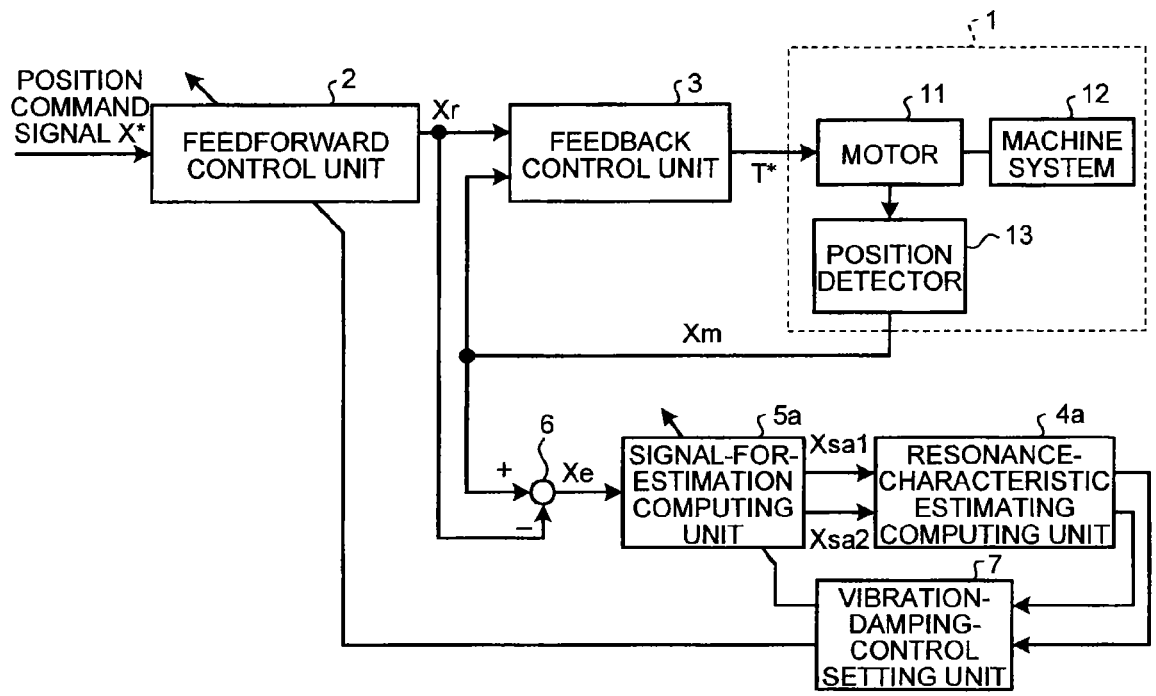
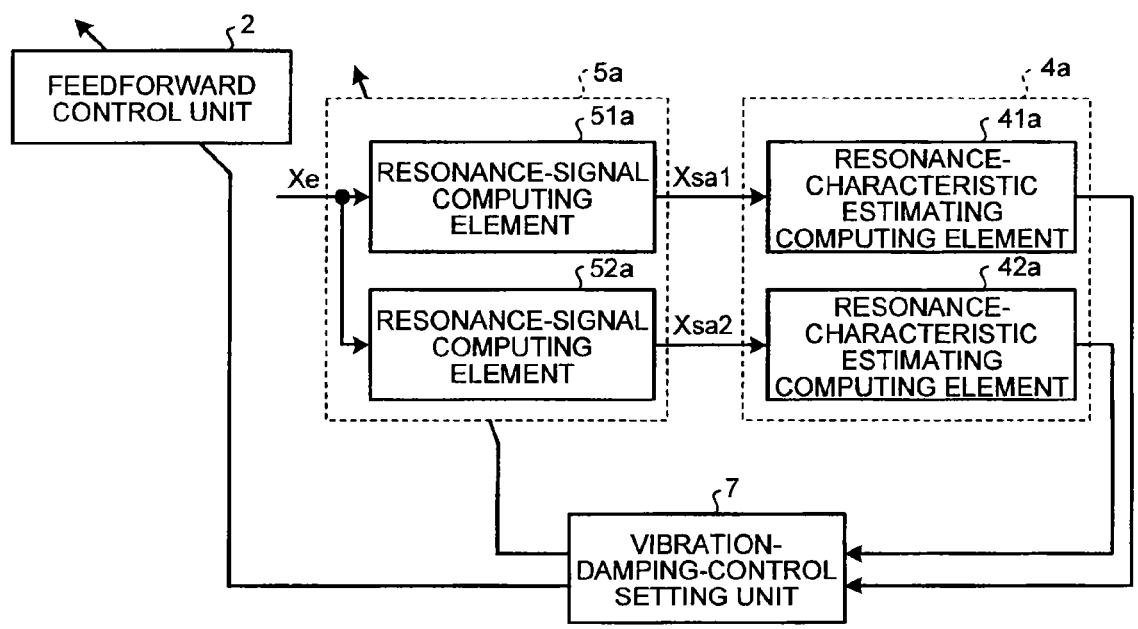

MOTOR CONTROL DEVICE

FIELD

The present invention relates to a motor control device that drives a controlled object including a motor and a mechanical system coupled to the motor.

BACKGROUND

In a motor control device, when positioning driving is performed in a controlled object having low rigidity, residual vibration sometimes occurs during setting because of machine resonance or the like. In such a case, a feedforward control unit computes, in response to an operation command, a feedforward signal to reduce a signal component of a vibration frequency of the controlled object and uses the feedforward signal for control to perform vibration-damping control for suppressing the residual vibration that occurs in the controlled object. To perform such vibration-damping control, it is necessary to set parameters of feedforward control according to a vibration frequency and an attenuation coefficient of resonance characteristics of a control system including the controlled object.

For example, Patent Literature 1 disclosed a technology including a feedforward signal generator configured to generate, based on a driving command signal, a feedforward signal to minimize a signal component at a vibration frequency of a controlled object and add the feedforward signal to the driving command signal, a resonance-signal computing element configured to receive an input of a signal corresponding to the position, speed, or acceleration of the controlled object and output a resonance signal computed using a transfer function, which has a maximal gain at a vibration-damping frequency, and a resonance estimating element configured to estimate a resonance frequency of the controlled object based on the resonance signal.

However, depending on a controlled object to be driven, residual vibration that occurs during setting of positioning driving sometimes have a waveform in which two or more vibration frequencies are superimposed. In such a case, it is sometimes possible to suppress the residual vibration and perform high-speed positioning driving by applying vibration-damping control to the two or more vibration frequencies. For that purpose, it is necessary to estimate a frequency and an attenuation coefficient from residual vibration in which the two or more frequencies, which are subjected to the vibration-damping control, are superimposed and set the frequency and the attenuation coefficient in the feedforward control unit.

As a problem different from the residual vibration control, there is a method of appropriately setting a notch filter used for suppressing oscillation that make a control system unstable because of a high-frequency machine resonance characteristic. As the method, for example, Patent Literature 2 discloses a technology including a plurality of notch filters configured to attenuate a signal component of a near frequency centering on a notch frequency with respect to an input signal, a plurality of vibration extraction filters in which differ frequency bands are set to be associated with the respective notch filters, the vibration extraction filters extracting vibration components of the set frequency bands from a speed detection signal obtained as a motion amount, and a plurality of notch control units arranged to respectively correspond to the vibration extraction filters and configured to control notch frequencies of the corresponding notch filters to reduce the amplitude of the vibration components extracted by the vibration extraction filters.

CITATION LIST

Patent Literature

Patent Literature 1: Japanese Patent Application Laid-open No. 2005-39954
Patent Literature 2: Japanese Patent Application Laid-open No. 2009-296746

SUMMARY

Technical Problem

However, the technology disclosed in Patent Literature 1 does not take into account a method for accurately estimating a vibration frequency and an attenuation coefficient from vibration in which a plurality of frequencies are superimposed. As a method of estimating a frequency and an attenuation coefficient of vibration in which a plurality of frequencies are superimposed, there is a method of estimating the frequency and the attenuation coefficient using a frequency analysis such as FFT. However, there is a problem in that data having a certain degree of length is necessary to perform a highly-accurate analysis and a computing load increases.

A characteristic of vibration can be estimated with a relatively small calculation load using a calculation method of an identification algorithm such as a least squares method. However, there is a problem in that, when the characteristic is estimated from vibration in which two or more frequencies are superimposed, accurate estimation cannot be performed because of an interference of vibrations of the frequencies.

In the technology disclosed in Patent Literature 2, to accurately estimate a vibration frequency in which two or more frequencies are superimposed, it is necessary to individually extract a plurality of vibration frequencies separately. Therefore, there is a problem in that, when the vibration frequencies are close to one another, it is difficult to appropriately set pass-frequency bands of the vibration extraction filters.

The present invention has been devised in view of the above and it is an object of the present invention to obtain a motor control device that can accurately estimate a frequency and an attenuation coefficient of residual vibration in which a plurality of frequencies are superimposed.

Solution to Problem

In order to solve above-mentioned problems and achieve the object, there is provided a motor control device according to the present invention includes a feedforward control unit configured to compute a feedforward signal according to an input operation command to reduce signal components at a set plurality of vibration-damping frequencies; a driving-command computing unit configured to compute, using the feedforward signal, a driving command for driving a controlled object; a vibration-damping-control setting unit configured to designate one candidate frequency of a plurality of candidate frequencies for a vibration-damping frequency; a signal-for-estimation computing unit configured to output, based on an operation signal corresponding to a value of a position, a speed, or an acceleration related to the controlled object, a signal for estimation in which the signal components of the other candidate frequencies excluding the designated one candidate frequency are reduced from vibration components of a control system including the controlled object; and a resonance-characteristic estimating unit configured to estimate one resonance frequency from the output signal for estimation, wherein the vibration-damping-control setting unit designates each of the candidate frequencies individually as one candidate frequency and sets, as the vibration-damping frequency of the feedforward control unit, each of resonance frequencies estimated by the resonance-characteristic estimating unit related to the individually designated one candidate frequency.

Advantageous Effects of Invention

According to the present invention, there is an effect that it is possible to improve estimation accuracy of a frequency and an attenuation coefficient of residual vibration in which a plurality of frequencies are superimposed.

BRIEF DESCRIPTION OF DRAWINGS

FIG. 7 is a flowchart for explaining a vibration-damping control automatic adjusting method of the motor control device shown in FIG. 1.

FIG. 8 is a block diagram of a schematic configuration of the motor control device according to a second embodiment of the present invention.

FIG. 9 is a block diagram of a configuration related to estimation of a resonance characteristic of a control system in the motor control device shown in FIG. 8.

DESCRIPTION OF EMBODIMENTS

Embodiments of a motor control device according to the present invention are explained in detail below based on the drawings. The present invention is not limited to the embodiments.

First Embodiment

Figure 1:
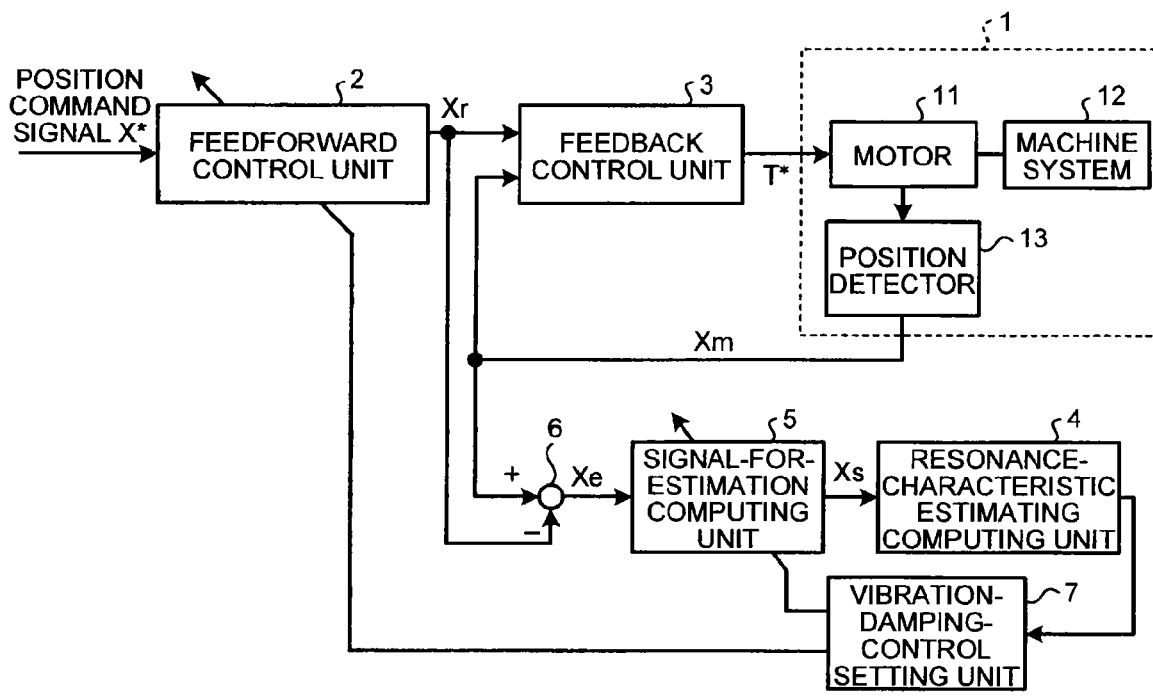
FIG. 1 is a block diagram of a schematic configuration of a a motor control device according to a first embodiment of the present invention.

FIG. 1 is a block diagram of a schematic configuration of the motor control device according to a first embodiment of the present invention. In FIG. 1, in a controlled object 1, a motor 11, a machine system 12 coupled to the motor 11, and a position detector 13 that detects the position of the motor 11 are provided. As the position detector 13, an encoder, a linear scale, or the like can be used.

The motor 11 generates a driving force of a rotational or linear motion according to a driving command T* to drive the machine system 12. The position detector 13 detects the position of the motor 11 and outputs a position signal Xm.

On the other hand, the motor control device can drive the motor 11 while performing vibration-damping control at N (N is an integer equal to or larger than 2) vibration-damping frequencies. The motor control device can estimate a resonance characteristic of a control system based on an operation signal equivalent to a value of the position or the speed or the acceleration of the control system including the controlled object 1 at the time when the motor 11 is driven while being subjected to the vibration-damping control. The resonance characteristic of the control system is represented by a resonance frequency and a resonance attenuation coefficient of the control system.

In the motor control device, a feedforward control unit 2, a feedback control unit 3, a resonance-characteristic estimating computing unit 4, a signal-for-estimation computing unit 5, a subtracter 6, and a vibration-damping-control setting unit 7 are provided.

The feedforward control unit 2 outputs a vibration-damping position command signal Xr, which is a feedforward signal, according to a position command signal X*, which is an operation command to the controlled object 1. The feedback control unit 3 performs a control arithmetic operation including arithmetic operations (PID arithmetic operations) of proportion, integration, and differentiation according to the vibration-damping position command signal Xr and the position signal Xm and outputs the driving command T*.

To remove components other than vibration due to a resonance characteristic of the control system including the controlled object 1, the subtracter 6 subtracts the vibration-damping position command signal Xr from the position signal Xm and outputs a vibration signal Xe.

The signal-for-estimation computing unit 5 computes a signal for estimation Xs according to the vibration signal Xe. The resonance-characteristic estimating computing unit 4 estimates a resonance characteristic of the control system from vibration included in the signal for estimation Xs using an identification method such as a least squares method. The vibration-damping-control setting unit 7 stores an estimation result of the resonance characteristic of the control system and sets computation characteristics of the feedforward control unit 2 and the signal-for-estimation computing unit 5.

When the controlled object 1 is driven according to the position command signal X*, the position signal Xm becomes oscillatory. In that case, the feedforward control unit 2 computes, according to the position command signal X*, the vibration-damping position command signal Xr to reduce a signal component of the resonance frequency of the control system including the controlled object 1. Consequently, the feedforward control unit 2 can realize vibration-damping control for suppressing vibration included in the position signal Xm of a response to the position command signal X.

A computing method of the feedforward control unit 2 is specifically explained.

A relation between the position command signal X* and the vibration-damping position command signal Xr is represented by Formula (1) below using a Laplacian operator and a transfer function Fr(s).

$$Xr = Fr(s) \cdot X^* \quad (1)$$

The transfer function Fr(s) is configured as indicated by Formula (2) below using a vibration-damping frequency and a vibration-damping attenuation coefficient "ωn_i, ζn_i" (i=1, 2, ..., and N). Consequently, the feedforward control unit 2 can output the vibration-damping position command signal Xr to reduce a signal component at the vibration-damping frequency on ωn_i.

$$Fr(s) = \frac{\prod_{i=1}^{N}(\omega n\_i^{-2} \cdot s^2 + 2\zeta n\_i \cdot \omega n\_i^{-1} \cdot s + 1)}{a_{2N} \cdot s^{2N} + a_{2N-1} \cdot s^{2N-1} + \ldots + a_1 \cdot s + 1} \quad (2)$$

Appropriate constants are set for $a_{2N}, a_{2N-1}, \ldots,$ and $a_1$.

The vibration of the resonance frequency of the control system appearing in the position signal Xm with respect to the position command signal X* can be suppressed by matching the vibration-damping frequency on ωn_i to the resonance frequency of the control system. Similarly, the vibration of the resonance frequency of the control system appearing in the position signal Xm with respect to the position command signal X* can be suppressed by matching the vibration-damping attenuation coefficient ζn_i to the resonance attenuation coefficient of the control system.

When there are errors between the vibration-damping frequency and the vibration-damping attenuation coefficient set in the feedforward control unit 2 and the resonance frequency and the resonance attenuation coefficient of the control system, a vibration appears in the position signal Xm. Therefore, it is necessary to accurately obtain the resonance frequency and the resonance attenuation coefficient of the control system.

A method of estimating a resonance frequency and a resonance attenuation coefficient of the control system, i.e., a resonance characteristic of the control system is explained below.

Figure 2:
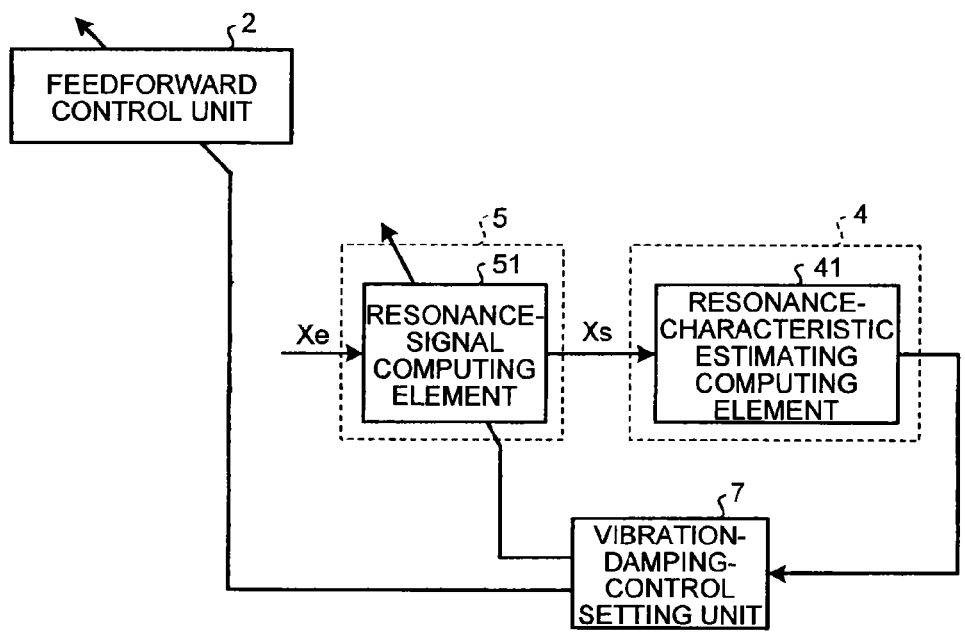
FIG. 2 is a block diagram of a configuration related to estimation of a resonance characteristic of a control system in the motor control device shown in FIG. 1.

FIG. 2 is a block diagram of a configuration related to estimation of a resonance characteristic of the control system in the motor controlled object shown in FIG. 1. In FIG. 2, the resonance-characteristic estimating computing unit 4 includes a resonance-characteristic estimating computing element 41. The resonance-characteristic estimating computing unit 4 estimates a resonance characteristic of the control system from a vibration component included in an input signal. However, when the amplitude of the vibration component included in the input signal decreases, a vibration characteristic estimation accuracy of the resonance-characteristic estimating computing element 41 decreases because of the influence of noise and the like.

When the amplitude of vibration caused in the position signal Xm by the vibration-damping control decreases, an accurate estimation is difficult because the amplitude of the vibration component of the input signal input to the resonance-characteristic estimating computing element 41 also decreases. Therefore, the resonance-characteristic estimating computing element 41 estimates a resonance characteristic of the control system by estimating a characteristic of the vibration included in the signal for estimation Xs output by the signal-for-estimation computing unit 5.

The signal-for-estimation computing unit 5 includes a resonance-signal computing element 51. The resonance-signal computing element 51 receives an input of the vibration signal Xe and outputs the signal for estimation Xs based on computation of a transfer function Fv(s) represented by Formula (3) below using a vibration excitation frequency ωl and a vibration excitation attenuation coefficient ζl.

$$Fv(s) = \frac{1}{\omega l^{-2} \cdot s^2 + 2\zeta l \cdot \omega l^{-1} \cdot s + 1} \quad (3)$$

The transfer function Fv(s) represents a characteristic for increasing a signal component of the vibration excitation frequency ωl. The resonance-signal computing element 51 amplifies the signal component of the vibration excitation frequency ωl with respect to the vibration signal Xe and outputs the signal for estimation Xs. The denominator of the transfer function Fv(s) can be matched to a numerator element concerning a vibration-damping frequency ωn_k of a transfer function Fr(s) of the feedforward control unit 2 by setting the vibration excitation frequency ωl and the vibration excitation attenuation coefficient ζl to coincide with one vibration-damping frequency and one vibration-damping attenuation frequency "ωn_k, ζn_k". In other words, the resonance-signal computing element 51 has a transfer characteristic based on an inverse characteristic of the feedforward control unit 2 at the vibration-damping frequency ωn_k.

As a result, the vibration appearing in the position signal Xm is suppressed by the vibration-damping control by the computation of the feedforward control unit 2. However, a vibration having a large amplitude, in which the effect of the vibration-damping control at the vibration-damping frequency ωn_k is cancelled, appears in the signal for estimation Xs.

The resonance-characteristic estimating computing element 41 estimates a resonance frequency ωp_k and a resonance attenuation coefficient ζp_k using an identification method such as the least squares method. Because the resonance-characteristic estimating computing element 41 estimates the resonance frequency ωp_k and the resonance attenuation coefficient ζp_k from the signal for estimation Xs in which the vibration having the large amplitude appears. Therefore, it is possible to improve estimation accuracy.

The vibration-damping-control setting unit 7 performs parameter setting for the feedforward control unit 2 and the resonance-signal computing element 51 based on an estimation result of the resonance-characteristic estimating computing unit 4.

As explained above, the motor control device according to the first embodiment can accurately estimate a resonance frequency and a resonance attenuation coefficient of the control system and set a vibration-damping frequency and a vibration-damping attenuation coefficient of the feedforward control unit 2 to coincide with the resonance frequency and the resonance attenuation coefficient of the control system. The motor control device can realize the vibration-damping control for suppressing the vibration appearing in the position signal Xm with respect to the position command signal X*.

The resonance-characteristic estimating computing unit 4 sometimes cannot obtain an accurate estimation result only by performing the estimation operation for a resonance characteristic of the control system for one input of the position command signal X*. Therefore, to improve an estimation accuracy of a resonance characteristic, the motor control device repeats the estimation operation for a resonance characteristic of one control system a plurality of times.

Figure 3:
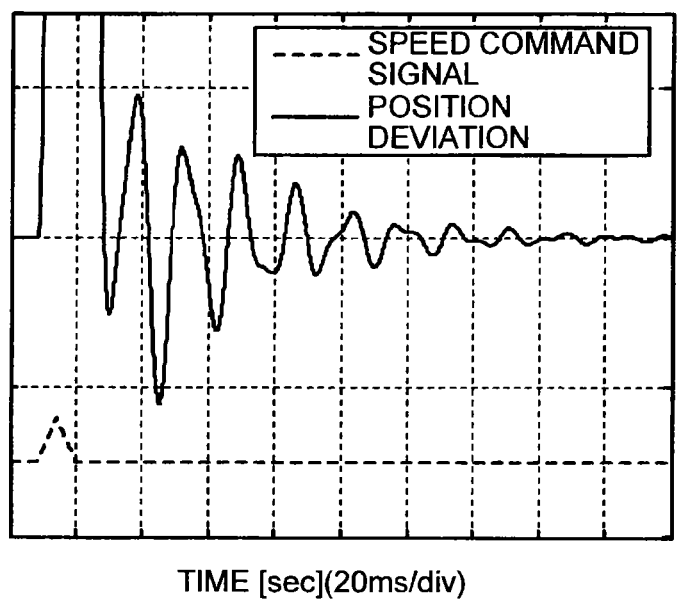
FIG. 3 is a diagram of waveforms of a speed command signal and a position deviation obtained when vibration-damping control is not performed in the motor control device shown in FIG. 1.

FIG. 3 is a diagram of waveforms of a speed command signal and a position deviation obtained when the vibration-damping control is not performed in the motor control device shown in FIG. 1. The speed command signal is a value obtained by converting an amount of change of the position command signal X* into a speed. The position deviation is a value obtained by subtracting the position signal Xm from the position command signal X.

In FIG. 3, because the vibration-damping control is not performed in the motor control device, a waveform in which vibration waveforms of two frequencies are superimposed due to resonance characteristics K1 and K2 of the control system appears in the position deviation.

Figure 4:
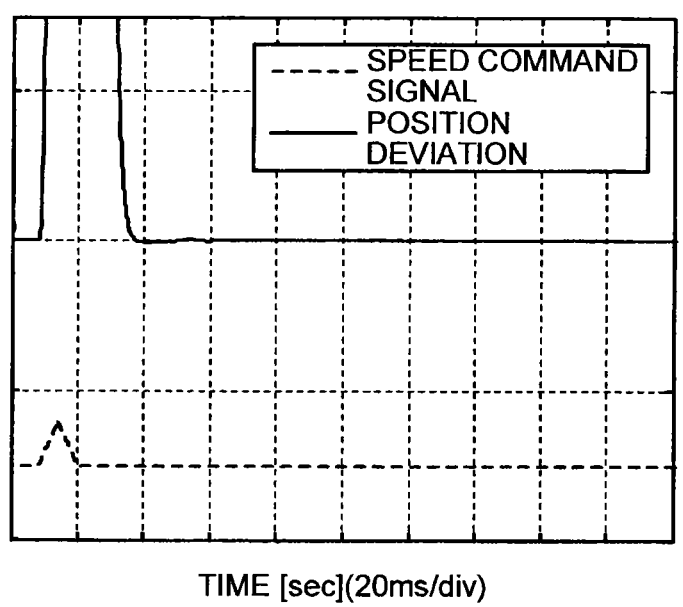
FIG. 4 is a diagram of waveforms of a speed command signal and a position deviation obtained when the vibration-damping control is performed in the motor control device shown in FIG. 1.

FIG. 4 is a diagram of waveforms of a speed command signal and a position deviation obtained when the vibration-damping control is performed in the motor control device shown in FIG. 1. In FIG. 4, the feedforward control unit 2 can suppress the vibration waveform in FIG. 3 appearing in the position deviation by performing the vibration-damping control at two vibration-damping frequencies.

A method of estimating a resonance frequency and a resonance attenuation coefficient of the control system and setting the resonance frequency and the resonance attenuation coefficient in the feedforward control unit 2 is explained.

Figure 5:
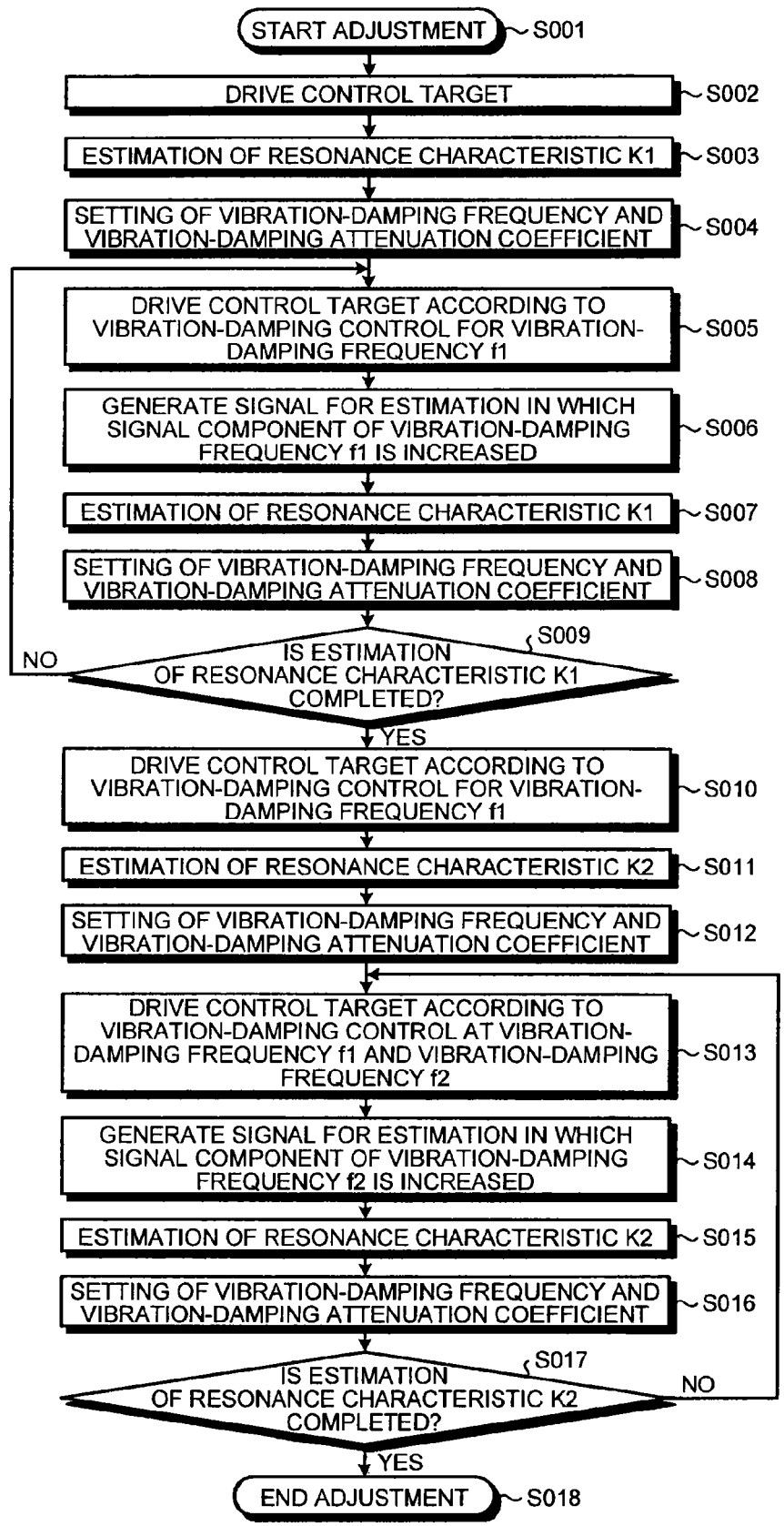
FIG. 5 is a flowchart for explaining problems in a method of estimating resonance frequencies and resonance attenuation coefficients of a plurality of control systems.

FIG. 5 is a flowchart for explaining a method of estimating resonance characteristics of a plurality of control systems in a sequence for, after completing an estimation of one resonance characteristic, starting an estimation of another resonance frequency. In this method, there is a problem in that a resonance frequency and a resonance attenuation coefficient of the control system cannot be accurately estimated and the effect of the vibration-damping control is not sufficiently obtained. This is because there is a problem in a method of estimating resonance frequencies and resonance attenuation coefficients of a plurality of control systems one by one in sequential order. The problems are explained below. In FIG. 5, in the motor control device in an initial state, the vibration-damping control by the feedforward control unit 2 and the setting of computation based on Formula (3) by the resonance-signal computing element 51 are not performed. Therefore, an adjustment of the vibration-damping control and the computation based on Formula (3) is started in a disabled state (step S001).

When the controlled object 1 is driven according to a first input of the position command signal X*, because the vibration-damping control by the feedforward control unit 2 is disabled, a vibration due to a resonance characteristic of the control system appears in the vibration signal Xe based on a position of the motor 11 (step S002).

Because the computation based on Formula (3) is disabled, the resonance-signal computing element 51 outputs the signal for estimation Xs that coincides with the vibration signal Xe. The resonance-characteristic estimating computing element 41 estimates one of resonance characteristics of the control system from the signal for estimation Xs. An estimation result at this point is a resonance frequency c1 and a resonance attenuation coefficient e1 in a resonance characteristic K1 of the control system (step S003).

The vibration-damping-control setting unit 7 stores the estimated resonance frequency c1 and the estimated resonance attenuation coefficient e1 of the control system as a candidate frequency c1' and a candidate attenuation coefficient e1', sets a vibration-damping frequency f1 and a vibration-damping attenuation coefficient h1 of the feedforward control unit 2 to coincide with the candidate frequency c1' and the candidate attenuation coefficient e1', and enables, for the next input of the position command signal X*, the vibration-damping control at the vibration-damping frequency f1 by the feedforward control unit 2. The vibration-damping-control setting unit 7 sets a vibration excitation frequency p and a vibration excitation attenuation coefficient q of the resonance-signal computing element 51 to coincide with the candidate frequency c1' and the candidate attenuation coefficient e1' and enables the computation based on Formula (3) (step S004).

When the controlled object 1 is driven according to a second input of the position command signal X*, according to the vibration-damping control at the vibration-damping frequency f1 in the feedforward control unit 2, the vibration signal Xe changes to a waveform in which the vibration of the resonance frequency c1 is suppressed (step S005).

The resonance-signal computing element 51 outputs the signal for estimation Xs in which a signal component of the vibration excitation frequency p is increased, i.e., a signal component of the vibration-damping frequency f1 is increased with respect to the vibration signal Xe (step S006). The signal for estimation Xs changes to a waveform equivalent to a waveform obtained when the vibration-damping control at the vibration-damping frequency f1 is disabled. Therefore, the resonance-characteristic estimating computing element 41 estimates the resonance frequency c1 and the resonance attenuation coefficient e1 in the resonance characteristic K1 of the control system from the signal for estimation Xs as at step S003 (step S007).

The vibration-damping-control setting unit 7 updates the candidate frequency c1' and the candidate attenuation coefficient e1' from the estimated resonance frequency c1 and the estimated resonance attenuation coefficient e1 of the control system. The vibration-damping-control setting unit 7 updates the vibration-damping frequency f1 and the vibration-damping attenuation coefficient h1 of the feedforward control unit 2 to coincide with the candidate frequency c1' and the candidate attenuation coefficient e1'. For the resonance-signal computing element 51, the vibration-damping-control setting unit 7 updates the vibration excitation frequency p and the vibration excitation attenuation coefficient q to coincide with the candidate frequency c1' and the candidate attenuation coefficient e1' (step S008).

When an estimation result of the resonance frequency c1 and the resonance attenuation coefficient e1 of the control system is values equivalent to the last estimation result, i.e., the estimation result converges, the estimation of the resonance characteristic K1 is completed. The processing shifts to an estimation of a resonance characteristic K2 of the control system. When the estimation result does not converge, the operations from step S005 are repeated (step S009).

According to the shift to the estimation of the resonance characteristic K2, the computation based on Formula (3) by the resonance-signal computing element 51 is disabled for the next input. On the other hand, the vibration-damping control at the vibration-damping frequency f1 set at step S008 in the feedforward control unit 2 is maintained. Therefore, when the controlled object 1 is driven according to the next input of the position command signal X*, the vibration signal Xe changes to a waveform in which the vibration of the resonance frequency c1 is suppressed (step S010).

Because the computation based on Formula (3) is disabled, the resonance-signal computing element 51 outputs the signal for estimation Xs that coincides with the vibration signal Xe. In the signal for estimation Xs, the vibration of the resonance frequency c1 of the control system is suppressed. Therefore, the resonance-characteristic estimating computing element 41 estimates a resonance frequency c2 and a resonance attenuation coefficient e2 of the resonance characteristic K2 of the control system (step S011).

The vibration-damping-control setting unit 7 stores the estimated resonance frequency c2 and the estimated resonance attenuation coefficient e2 of the control system as a candidate frequency c2' and a candidate attenuation coefficient e2', sets a vibration-damping frequency f2 and a vibration-damping attenuation coefficient h2 of the feedforward control unit 2 to coincide with the candidate frequency c2' and the candidate attenuation coefficient e2', and enables, for the next input of the position command signal X*, vibration-damping control at the vibration-damping frequency f1 and the vibration-damping frequency f2 by the feedforward control unit 2. The vibration-damping-control setting unit 7 sets the vibration excitation frequency p and the vibration excitation attenuation coefficient q of the resonance-signal computing element 51 to coincide with the candidate frequency c2' and the candidate attenuation coefficient e2' and enables the computation based on Formula (3) (step S012).

When the controlled object 1 is driven according to the next input of the position command signal X*, according to the vibration-damping control at the vibration-damping frequency f1 and the vibration-damping frequency f2 in the feedforward control unit 2, the vibration signal Xe changes to a waveform in which vibrations of the resonance frequency c1 and the resonance frequency c2 are suppressed (step S013).

The resonance-signal computing element 51 outputs the signal for estimation Xs in which the signal component of the vibration excitation frequency p is increased, i.e., a signal component of the vibration-damping frequency f2 is increased according to the vibration signal Xe (step S014). The signal for estimation Xs changes to a waveform corresponding to a waveform obtained when the vibration-damping control at the vibration-damping frequency f2 is disabled. Therefore, the resonance-characteristic estimating computing element 41 estimates the resonance frequency c2 and the resonance attenuation coefficient e2 in the resonance characteristic K2 of the control system from the signal for estimation Xs as in the case of step S011 (step S015).

The vibration-damping-control setting unit 7 updates the candidate frequency c2' and the candidate attenuation coefficient e2' to coincide with the estimated resonance frequency c2 and the estimated resonance attenuation coefficient e2 of the control system. The vibration-damping-control setting unit 7 updates the vibration-damping frequency f2 and the vibration-damping attenuation coefficient h2 of the feedforward control unit 2 to coincide with the candidate frequency c2' and the candidate attenuation coefficient e2'. For the resonance-signal computing element 51, the vibration-damping-control setting unit 7 updates the vibration excitation frequency p and the vibration excitation attenuation coefficient q to coincide with the candidate frequency c2' and the candidate attenuation coefficient e2' (step S016).

When an estimation result of the resonance frequency c2 and the resonance attenuation coefficient e2 of the control system is values equivalent to the last estimation result, i.e., the estimation result converges, the estimation of the resonance characteristic K2 is completed. When the estimation result does not converge, the operations from step S013 are repeated (step S017). When the estimation of the resonance characteristic K2 is completed, the vibration-damping-control setting unit 7 sets the candidate frequencies c1' and c2' and the candidate attenuation coefficients e1' and e2' as the vibration-damping frequencies f1 and f2 and the vibration-damping attenuation coefficients h1 and h2 of the feedforward control unit 2 and ends the adjustment of the vibration-damping control (step S018). However, in this method, the resonance frequencies c1 and c2 and the resonance attenuation coefficients e1 and e2 of the control system cannot be accurately estimated and the effect of the vibration-damping control is not sufficiently obtained.

Figure 6:
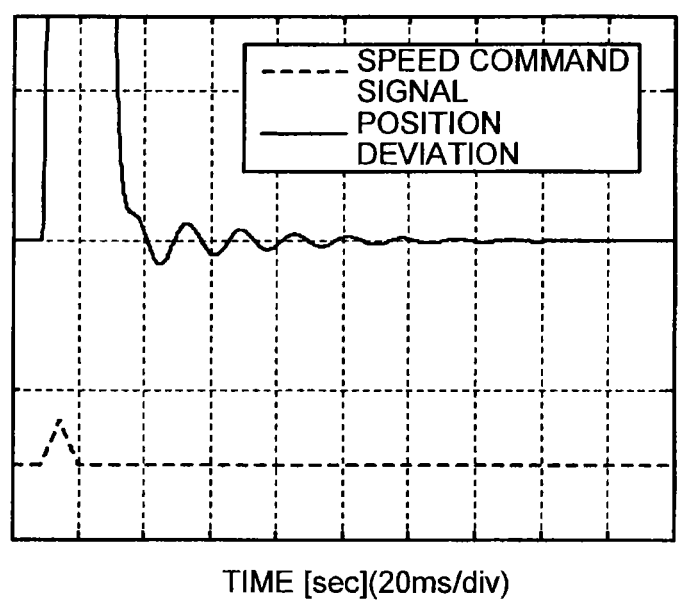
FIG. 6 is a diagram of waveforms of a speed command signal and a position deviation obtained when the vibration-damping control is performed using a result obtained by performing automatic adjustment for the vibrating-damping control in the method shown in FIG. 5.

FIG. 6 is a diagram of waveforms of a speed command signal and a position deviation obtained when the vibration-damping control is performed using a result obtained by performing an automatic adjustment for the vibrating-damping control in the method shown in FIG. 5. In FIG. 6, the vibration of the resonance frequency c1 of the control system remains in the position deviation. This is because errors occur between the vibration-damping frequency f1 and the vibration-damping attenuation coefficient h1 set in the feedforward control unit 2 and the resonance frequency c1 and the resonance attenuation coefficient e1 of the control system.

Such a phenomenon occurs because an estimation of the resonance frequency c1 and the resonance attenuation coefficient e1 of the control system is performed using the signal for estimation Xs in which the vibration of the resonance frequency c2 of the control system is not suppressed. The resonance frequency c1 and the resonance attenuation coefficient e1 of the control system cannot be accurately estimated because of an interference of the vibration of the resonance frequency c2.

As explained above, in the method shown in FIG. 5, accurate estimation of a resonance characteristic of the control system cannot be performed. Therefore, because the vibration-damping control using an accurate estimation result cannot be performed, a sufficient vibration suppressing effect is not obtained.

FIG. 7 is a flowchart for explaining a vibration-damping control automatic adjusting method in the motor control device shown in FIG. 1. In FIG. 7, a method of solving the problems explained above is shown. In FIG. 7, in the motor control device in the initial state, the vibration-damping control by the feedforward control unit 2 and the setting of computation based on Formula (3) by the resonance-signal computing element 51 are not performed. Therefore, the vibration-damping, control and the computation based on Formula (3) are disabled and an adjustment of the vibration-damping control and the computation is started (step S101).

When the controlled object 1 is driven according to a first input of the position command signal X*, because the vibration-damping control by the feedforward control unit 2 is disabled, a vibration due to a resonance characteristic of the control system appears in the vibration signal Xe based on a position of the motor 11 (step S102).

Because the computation based on Formula (3) is disabled, the resonance-signal computing element 51 outputs the signal for estimation Xs that coincides with the vibration signal Xe. The resonance-characteristic estimating computing element 41 estimates one of resonance characteristics of the control system from the signal for estimation Xs. An estimation result at this point is set as a resonance frequency c1 and a resonance attenuation coefficient e1 of a resonance characteristic K1 of the control system (step S103).

The vibration-damping-control setting unit 7 stores the estimated resonance frequency c1 and the estimated resonance attenuation coefficient e1 of the control system as the candidate frequency c1' and the candidate attenuation coefficient e1', sets the vibration-damping frequency f1 and the vibration-damping attenuation coefficient h1 of the feedforward control unit 2 to coincide with the candidate frequency c1' and the candidate attenuation coefficient e1', and enables, for the next input of the position command signal X*, the vibration-damping control at the vibration-damping frequency f1 by the feedforward control unit 2. On the other hand, for the resonance-signal computing element 51, the vibration-damping-control setting unit 7 maintains the enabling of the computation based on Formula (3) (step S104).

When the controlled object 1 is driven according to a second input of the position command signal X*, according to the vibration-damping control at the vibration-damping frequency f1 in the feedforward control unit 2, the vibration signal Xe changes to a waveform in which the vibration of the resonance frequency c1 is suppressed (step S105).

Because the computation based on Formula (3) is disabled, the resonance-signal computing element 51 outputs the signal for estimation Xs that coincides with the vibration signal Xe. Because the signal for estimation Xs has a waveform in which the vibration of the resonance frequency c1 of the control system is suppressed, the resonance-characteristic estimating computing element 41 estimates the resonance frequency c2 and the resonance attenuation coefficient e2 of the resonance characteristic K2, which is a resonance characteristic of another control system (step S106).

The vibration-damping-control setting unit 7 stores the estimated resonance frequency c2 and the estimated resonance attenuation coefficient e2 of the control system as the candidate frequency c2' and the candidate attenuation coefficient e2', sets the vibration-damping frequency f2 and the vibration-damping attenuation coefficient h2 of the feedforward control unit 2 to coincide with the candidate frequency c2' and the candidate attenuation coefficient e2', and enables the vibration-damping control at the vibration-damping frequency f1 and the vibration-damping frequency f2 by the feedforward control unit 2.

The vibration-damping-control setting unit 7 sets, for the next input of the position command signal X*, to output the signal for estimation Xs in which only a signal component of the resonance frequency c2 is reduced, the vibration excitation frequency p and the vibration excitation attenuation coefficient q of the resonance-signal computing element 51 to coincide with the candidate frequency c1' and the candidate attenuation coefficient e1' and enables the computation based on Formula (3) (step S107).

When the controlled object 1 is driven according to a third input of the position command signal X*, according to the vibration-damping control at the vibration-damping frequency f1 and the vibration-damping frequency f2 in the feedforward control unit 2, the vibration signal Xe changes to a waveform in which the vibrations of the resonance frequency c1 and the resonance frequency c2 are suppressed (step S108).

The resonance-signal computing element 51 computes the signal for estimation Xs in which the signal component of the vibration excitation frequency p is increased, i.e., the signal component of the vibration-damping frequency f1 is increased with respect to the vibration signal Xe (step S109). The signal for estimation Xs changes to a waveform corresponding to a waveform obtained when only the vibration-damping control at the vibration-damping frequency f2 is enabled. Therefore, the resonance-characteristic estimating computing element 41 estimates the resonance frequency c1 and the resonance attenuation coefficient e1 in the resonance characteristic K1 of the control system from the signal for estimation Xs (step S110).

The vibration-damping-control setting unit 7 updates the candidate frequency c1' and the candidate attenuation coefficient e1' to coincide with the estimated resonance frequency c1 and the estimated resonance attenuation coefficient e1 of the control system. The vibration-damping-control setting unit 7 updates the vibration-damping frequency f1 and the vibration-damping attenuation coefficient h1 of the feedforward control unit 2 to coincide with the candidate frequency c1' and the candidate attenuation coefficient e1' and maintains the enabling of the vibration-damping control at the vibration-damping frequency f1 and the vibration-damping frequency f2 by the feedforward control unit 2.

The vibration-damping-control setting unit 7 sets, for the next input of the position command signal X*, to output the signal for estimation Xs in which only the signal component of the resonance frequency c1 is reduced, the vibration excitation frequency p and the vibration excitation attenuation coefficient q in the resonance-signal computing element 51 to coincide with the candidate frequency c2' and the candidate attenuation coefficient e2' and enables the computation based on Formula (3) (step S111).

When the controlled object 1 is driven according to a fourth input of the position command signal X*, according to the vibration-damping control at the vibration-damping frequency f1 and the vibration-damping frequency f2 in the feedforward control unit 2, the vibration signal Xe changes to a waveform in which the vibrations of the resonance frequency c1 and the resonance frequency c2 are suppressed (step S112).

The resonance-signal computing element 51 computes the signal for estimation Xs in which the signal component of the vibration excitation frequency p is increased, i.e., the signal component of the vibration-damping frequency f2 is increased with respect to the vibration signal Xe (step S113). The signal for estimation Xs changes to a waveform corresponding to a waveform obtained when only the vibration-damping control at the vibration-damping frequency f1 is enabled. Therefore, the resonance-characteristic estimating computing element 41 estimates the resonance frequency c2 and the resonance attenuation coefficient e2 in the resonance characteristic K2 of the control system from the signal for estimation Xs (step S114).

The vibration-damping-control setting unit 7 updates the candidate frequency c2' and the candidate attenuation coefficient e2' to coincide with the estimated resonance frequency c2 and the estimated resonance attenuation coefficient e2 of the control system. The vibration-damping-control setting unit 7 updates the vibration-damping frequency f2 and the vibration-damping attenuation coefficient h2 of the feedforward control unit 2 to coincide with the candidate frequency c2' and the candidate attenuation coefficient e2' and maintains the enabling of the vibration-damping control at the vibration-damping frequency f1 and the vibration-damping frequency f2 by the feedforward control unit 2.

The vibration-damping-control setting unit 7 sets, for a next input of the position command signal X*, to output the signal for estimation Xs in which only the signal component of the resonance frequency c2 is reduced, the vibration excitation frequency p and the vibration excitation attenuation coefficient q in the resonance-signal computing element 51 to coincide with the candidate frequency c1' and the candidate attenuation coefficient e1' and enables the computation based on Formula (3) (step S115).

When the resonance frequency c1 and the resonance attenuation coefficient e1 and the resonance frequency c2 and the resonance attenuation coefficient e2 of the control system in an estimation result are values equivalent to those in the last estimation result, i.e., the estimation result converges, the estimation of the resonance characteristic is completed.

When the estimation result does not converge, the operations from step S108 are repeated (step S116). When the estimation of the resonance characteristic is completed, the vibration-damping-control setting unit 7 sets the vibration-damping frequency f1 and the vibration-damping attenuation coefficient h1 of the feedforward control unit 2 to coincide with the candidate frequency c1' and the candidate attenuation coefficient e1', sets the vibration-damping frequency f2 and the vibration-damping attenuation coefficient h2 of the feedforward control unit 2 to coincide with the candidate frequency c2' and the candidate attenuation coefficient e2', and ends the adjustment of the vibration-damping control (step S117).

The driving of the controlled object 1 in the waveform of the position deviation shown in FIG. 4 can be realized by performing the vibration-damping control based on the estimation result by the method shown in FIG. 7.

In the vibration-damping control automatic adjusting method according to the first embodiment, steps S109 to S110 are an individual estimation process for the resonance characteristic K1 of the control system. Steps S113 to S114 are an individual estimation process for the resonance characteristic K2 of the control system.

By sequentially repeating the change of the individual estimating processes, concerning estimation of the resonance frequency c1 and the resonance attenuation coefficient e1 of the control system, it is possible to use the signal for estimation Xs in which the vibration of the resonance frequency c2 of the control system is suppressed. It is possible to suppress an interference due to the vibration of the resonance frequency c2 of the control system and accurately estimate the resonance frequency c1 and the resonance attenuation coefficient e1.

On the other hand, concerning the resonance frequency c2 and the resonance attenuation coefficient e2 of the control system, because an estimation computation is performed from the signal for estimation Xs in which the vibration of the resonance frequency c1 of the control system is suppressed, it is possible to perform a accurate estimation.

In the motor control device according to the first embodiment, it is possible to realize a vibration-damping control for suppressing the vibrations of the resonance frequency c1 and the resonance frequency c2 of the control system.

In the above explanation, the two vibration-damping frequencies are set in the feedforward control unit 2. However, when two or more vibration-damping frequencies are set, likewise, it is possible to accurately estimate a resonance frequency and a resonance attenuation coefficient of the control system and realize the vibration-damping control. In that case, it is sufficient to increase the number of individual estimation processes according to the number of vibration-damping frequencies to be set and repeat a sequential execution of the individual estimation processes.

In the above explanation, as shown at steps S111 and S115, the setting of the feedforward control unit 2 is updated every time the resonance characteristic is individually estimated. However, rather than updating the setting every time the resonance characteristic is individually estimated, after all the resonance characteristics are estimated, the setting of the feedforward control unit 2 can be collectively updated, for example, before step S116.

In the above explanation, the estimation of the resonance characteristic is completed when the estimation result converges. However, it is also possible to continue the estimation of the resonance characteristic and perform correction of the vibration-damping control while causing the motor control device to operate.

In the above explanation, the designation of the candidate frequency is performed after the estimation for one input of the position command signal X* ends. However, the next designation of a candidate frequency can be performed after the same resonance characteristic is estimated for a few continuous inputs of the position command signal X*. Further, in the above explanation, the designation of the candidate frequency is performed according to the input of the position command signal X*. However, the designation of the candidate frequency can be performed according to a change in time or a position.

In the above explanation, the process of estimating a resonance frequency and a resonance attenuation coefficient of the control system and setting both of a vibration-damping frequency and a vibration-damping attenuation coefficient of the feedforward control unit 2 is explained. However, although an effect of the vibration-damping control is inferior, a vibration-damping coefficient can be fixed for simplification. In that case, an attenuation coefficient of the control system does not have to be estimated.

In the above explanation, the transfer function Fv(s) of the resonance-signal computing element 51 is the transfer characteristic based on the inverse characteristic of the feedforward control unit 2 at one vibration-damping frequency. However, when a setting of a somewhat shifted characteristic is performed, substantially the same operation can be performed, although the estimation result of the resonance-characteristic estimating computing element 41 is slightly deteriorated.

In the above explanation, the resonance-signal computing element 51 has the transfer characteristic represented by Formula (3). However, to eliminate the influence of noise and offset, a smooth transfer characteristic not having a pole or a zero that attenuation is a value equal to or smaller than 0.2 of a high-pass filter, a band-pass filter, or the like can be added to the transfer characteristic of Formula (3).

In the above explanation, the method of setting a signal input to the resonance-signal computing element 51 based on a signal input to the feedback control unit 3 is explained. However, a signal different from the signal input to the feedback control unit 3 can be used. For example, the same operation can be realized using an acceleration signal of the machine system 12 detected by an acceleration sensor attached to the machine system 12.

In the above explanation, the vibration-damping control is realized by performing the computation for reducing a signal component of a resonance frequency of the control system to the input of the position command signal X* in the feedforward control unit 2. However, the same operation can be realized when a unit for performing computation for shaping the position command signal X* to prevent vibration from appearing in the position signal Xm is provided instead of the feedforward control unit 2.

Second Embodiment

FIG. 8 is a block diagram of a schematic configuration of the motor control device according to a second embodiment of the present invention. In FIG. 8, in the controlled object 1, the motor 11, the machine system 12 coupled to the motor 11, and the position detector 13 that detects the position of the motor are provided. As in the motor control device according to the first embodiment, the controlled object 1 is driven according to the driving command T* computed by the feedforward control unit 2 and the feedback control unit 3 according to the position command signal X*. The position detector 13 outputs the position signal Xm indicating the position of the motor 11.

To remove components other than vibration due to a resonance characteristic of a control system including the controlled object 1, the subtracter 6 subtracts the vibration-damping position command signal Xr from the position signal Xm and outputs the vibration signal Xe.

A signal-for-estimation computing unit 5a outputs signals for estimation Xsa1 and Xsa2 according to the vibration signal Xe. A resonance-characteristic estimating computing unit 4a estimates a resonance characteristic of the control system including the controlled object 1 from the signals for estimation Xsa1 and Xsa2 using an identification method such as a least squares method. The vibration-damping-control setting unit 7 stores the resonance characteristic of the control system estimated by the resonance-characteristic estimating computing unit 4a and sets computing characteristics of the feedforward control unit 2 and the signal-for-estimation computing unit 5a.

The feedforward control unit 2 shown in FIG. 8 has a same function as the function of the feedforward control unit 2 of the motor control device according to the first embodiment and can realize vibration-damping control at a set vibration-damping frequency.

FIG. 9 is a block diagram of a configuration related to estimation of a resonance characteristic of the control system in the motor control device shown in FIG. 8. In FIG. 9, the signal-for-estimation computing unit 5a includes resonance-signal computing elements 51a and 52a, which have a same function as the function of the resonance-signal computing element 51 in the first embodiment. The resonance-signal computing elements 51a and 52a respectively output signals for estimation Xsa1 and Xsa2 in which a signal component of a vibration excitation frequency set for the vibration signal Xe is increased by computation based on Formula (3).

The resonance-characteristic estimating computing unit 4a includes resonance-characteristic estimating computing elements 41a and 42a, which have a same function as the function of the resonance-characteristic estimating computing element 41 in the first embodiment. The resonance-characteristic estimating computing elements 41a and 42a respectively estimate resonance characteristics of the control system from the signals for estimation Xsa1 and Xsa2.

As explained above, the motor control device according to the second embodiment includes the two sets of computing elements having the same functions as the functions of the resonance-signal computing element 51 and the resonance-characteristic estimating computing element 41 of the motor control device according to the first embodiment. The motor control device estimates a resonance frequency and a resonance attenuation coefficient of the control system. The vibration-damping-control setting unit 7 can realize vibration-damping control at two vibration-damping frequencies by setting an estimation result as a vibration-damping frequency and a vibration-damping attenuation coefficient of the feedforward control unit 2.

The resonance-characteristic estimating computing unit 4 sometimes cannot obtain an accurate estimation result only by performing the estimation operation for a resonance characteristic of the control system for one input of the position command signal X*. Therefore, to improve estimation accuracy of a resonance characteristic, the motor control device repeats the estimation operation for a resonance characteristic of one control system a plurality of times.

Figure 10:
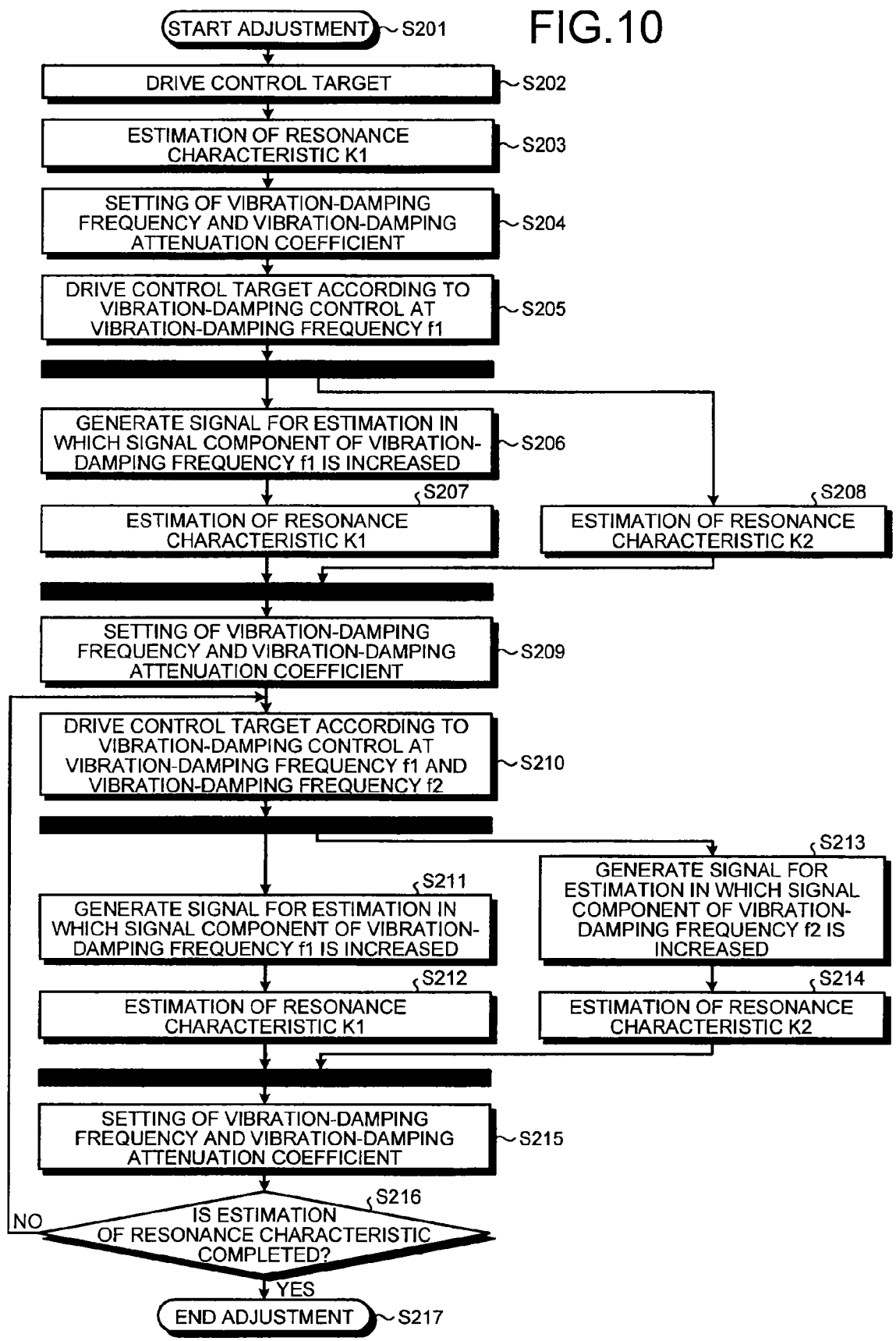
FIG. 10 is a flowchart for explaining a vibration-damping control automatic adjusting method of the motor control device shown in FIG. 8.

FIG. 10 is a flowchart for explaining a vibration-damping control automatic adjusting method of the motor control device shown in FIG. 8. In FIG. 10, in the motor control device in the initial state, the vibration-damping control by the feedforward control unit 2 and the setting of computation based on Formula (3) by the resonance-signal computing elements of the signal-for-estimation computing unit 5a are not performed. Therefore, the vibration-damping control and the computation based on Formula (3) are disabled and an adjustment of the vibration-damping control and the computation is started (step S201).

When the controlled object 1 is driven according to a first input of the position command signal X*, because the vibration-damping control by the feedforward control unit 2 is disabled, a vibration due to a resonance characteristic of the control system appears in the vibration signal Xe (step S202).

In the signal-for-estimation computing unit 5a, because the computation based on Formula (3) is disabled, the signals for estimation Xsa1 and Xsa2 output by the resonance-signal computing elements 51a and 52a coincide with the vibration signal Xe. The resonance-characteristic estimating computing unit 4a estimates resonance characteristics K1 of the control system from the signals for estimation Xsa1 and Xsa2 (step S203).

Because the signals for estimation Xsa1 and Xsa2 are signals having the same characteristic, an estimation result of the resonance-characteristic estimating computing unit 4a is one kind. The estimation result at this point is set as the resonance frequency c1 and the resonance attenuation coefficient e1 of the resonance characteristic K1 of the control system.

The vibration-damping-control setting unit 7 stores the estimated resonance frequency c1 and the estimated resonance attenuation coefficient e1 of the control system as the candidate frequency c1' and the candidate attenuation coefficient e1', sets the vibration-damping frequency f1 and the vibration-damping attenuation coefficient h1 of the feedforward control unit 2 to coincide with the candidate frequency c1' and the candidate attenuation coefficient e1', and enables, for a next input, the vibration-damping control at the vibration-damping frequency f1 by the feedforward control unit 2.

The vibration-damping-control setting unit 7 sets a vibration excitation frequency p1 and a vibration excitation attenuation coefficient q1 of the resonance-signal computing element 51a of the signal-for-estimation computing unit 5a to coincide with the candidate frequency c1' and the candidate attenuation coefficient e1' and enables the computation based on Formula (3). However, for the resonance-signal computing element 52a, the vibration-damping-control setting unit 7 maintains the disabling of the computation based on Formula (3) (step S204).

When the controlled object 1 is driven according to a second input of the position command signal X*, according to the vibration-damping control at the vibration-damping frequency f1 in the feedforward control unit 2, the vibration signal Xe changes to a waveform in which the vibration of the resonance frequency c1 is suppressed (step S205).

The resonance-signal computing element 51*a* of the signal-for-estimation computing unit 5*a* computes the signal for estimation Xsa1 in which a signal component of the vibration excitation frequency p1 increased, i.e., the signal component of the vibration-damping frequency f1 is increased with respect to the vibration signal Xe (step S206). The resonance-characteristic estimating computing element 41*a* of the resonance-characteristic estimating computing unit 4*a* estimates the resonance frequency c1 and the resonance attenuation coefficient e1 of the control system from the signal for estimation Xsa1 (step S207).

Because the computation based on Formula (3) is disabled, the resonance-signal computing element 52*a* of the signal-for-estimation computing unit 5*a* outputs the signal for estimation Xsa2 that coincides with the vibration signal Xe. Because the vibration of the resonance frequency c1 of the control system is suppressed in the signal for estimation Xsa2, the resonance-characteristic estimating computing element 42*a* of the resonance-characteristic estimating computing unit 4*a* estimates the resonance frequency c2 and the resonance attenuation coefficient e2 of the resonance characteristic K2 of the control system (step S208).

The vibration-damping-control setting unit 7 updates the candidate frequency c1' and the candidate attenuation coefficient e1' to coincide with the estimated resonance frequency c1 and the estimated resonance attenuation coefficient e1 of the control system. Further, the vibration-damping-control setting unit 7 stores the candidate frequency c2' and the candidate attenuation coefficient e2' to coincide with the estimated resonance frequency c2 and the estimated resonance attenuation coefficient e2. The vibration-damping-control setting unit 7 updates the vibration-damping frequency f1 and the vibration-damping attenuation coefficient h1 of the feedforward control unit 2 to coincide with the candidate frequency c1' and the candidate attenuation coefficient e1'. The vibration-damping-control setting unit 7 sets the vibration-damping frequency f2 and the vibration-damping attenuation coefficient h2 to coincide with the candidate frequency c2' and the candidate attenuation coefficient e2'.

Further, the vibration-damping-control setting unit 7 updates, for a next input of the position command signal X*, to output the signal for estimation Xsa1 in which only the signal component of the vibration-damping frequency f2 is reduced, the vibration excitation frequency p1 and the vibration excitation attenuation coefficient q1 of the resonance-signal computing element 51*a* to coincide with the candidate frequency c1' and the candidate attenuation coefficient e1'. The vibration-damping-control setting unit 7 sets, to output the signal for estimation Xsa2 in which only the signal component of the vibration-damping frequency f1 is reduced, the vibration excitation frequency p2 and the vibration excitation attenuation coefficient q2 of the resonance-signal computing element 52*a* to coincide with the candidate frequency c2' and the candidate attenuation coefficient e2' and enables the computation based on Formula (3) (step S209).

When the controlled object 1 is driven according to a third input of the position command signal X*, according to the vibration-damping control at the vibration-damping frequencies f1 and f2 in the feedforward control unit 2, the vibration signal Xe changes to a waveform in which the vibrations of the resonance frequencies c1 and c2 of the vibration signal Xe are suppressed (step S210).

The resonance-signal computing element 51*a* outputs the signal for estimation Xsa1 in which the signal component of the vibration excitation frequency p1 is increased, i.e., the signal component of the vibration-damping frequency f1 is increased with respect to the vibration signal Xe (step S211). The resonance-characteristic estimating computing element 41*a* estimates the resonance frequency c1 and the resonance attenuation coefficient e1 in the resonance characteristic K1 of the control system (step S212).

The resonance-signal computing element 52*a* outputs the signal for estimation Xsa2 in which a signal component of the vibration excitation frequency p2 is increased, i.e., the signal component of the vibration-damping frequency f2 is increased from the vibration signal Xe (step S213). The resonance-characteristic estimating computing element 42*a* estimates the resonance frequency c2 and the resonance attenuation coefficient e2 in the resonance characteristic K2 of the control system (step S214).

The vibration-damping-control setting unit 7 updates the candidate frequencies c1' and c2' and the candidate attenuation coefficients e1' and e2' to coincide with the estimated resonance frequencies c1 and c2 and the estimated resonance attenuation coefficients e1 and e2. The vibration-damping-control setting unit 7 updates the vibration-damping frequency f1 and the vibration-damping attenuation coefficient h1 of the feedforward control unit 2 to the candidate frequency c1' and the candidate attenuation coefficient e1'. The vibration-damping-control setting unit 7 updates the vibration-damping frequency f2 and the vibration-damping attenuation coefficient h2 to coincide with the candidate frequency c2' and the candidate attenuation coefficient e2'.

Further, the vibration-damping-control setting unit 7 updates, for a next input of the position command signal X*, to output the signal for estimation Xsa1 in which only the signal component of the vibration-damping frequency f2 is reduced, the vibration excitation frequency p1 and the vibration excitation attenuation coefficient q1 of the resonance-signal computing element 51*a* to coincide with the candidate frequency c1' and the candidate attenuation coefficient e1'. The vibration-damping-control setting unit 7 updates, to output the signal for estimation Xsa2 in which only the signal component of the vibration-damping frequency f1 is reduced, the vibration excitation frequency p2 and the vibration excitation attenuation coefficient q2 of the resonance-signal computing element 52*a* to coincide with the candidate frequency c2' and the candidate attenuation coefficient e2' (step S215).

When the resonance frequency c1 and the resonance attenuation coefficient e1 and the resonance frequency c2 and the resonance attenuation coefficient e2 of the control system of an estimation result are values equivalent to those of the last estimation result, i.e., the estimation result converges, the estimation of the resonance characteristic is completed.

When the estimation result does not converge, the operations from step S210 are repeated (step S216). When the estimation of the resonance characteristic is completed, the vibration-damping-control setting unit 7 sets the vibration-damping frequency f1 and the vibration-damping attenuation coefficient h1 of the feedforward control unit 2 to coincide with the candidate frequency c1' and the candidate attenuation coefficient e1', sets the vibration-damping frequency f2 and the vibration-damping attenuation coefficient h2 of the feedforward control unit 2 to coincide with the candidate frequency c2' and the candidate attenuation coefficient e2', and ends the adjustment of the vibration-damping control (step S217).

The driving of the controlled object 1 in the waveform of the position deviation shown in FIG. 4 can be realized by performing the vibration-damping control based on the estimation result by the method explained above.

In the vibration-damping control automatic adjusting method according to the second embodiment of the present invention, steps S211 to S212 are an individual estimation process for the resonance characteristic K1 of the control system. Steps S213 to S214 are an individual estimation process for the resonance characteristic K2 of the control system.

In the individual estimation process for the resonance characteristic K1 of the control system, by using the signal for estimation Xsa1 in which the vibration of the resonance frequency c2 of the control system is suppressed, it is possible to perform an accurate estimation by suppressing an interference due to the vibration of the resonance frequency c2 of the control system.

In the individual estimation process for the resonance characteristic K2 of the control system, by using the signal for estimation Xsa2 in which the vibration of the resonance frequency c1 of the control system is suppressed, it is possible to perform accurate estimation by suppressing an interference due to the vibration of the resonance frequency c1 of the control system.

It is possible to reduce time until the estimation completion by simultaneously carrying out the individual estimation processes. In the motor control device according to the second embodiment of the present invention, it is possible to realize the vibration-damping control for suppressing the vibrations of the resonance frequency c1 and the resonance frequency c2 of the control system.

In the above explanation, the two vibration-damping frequencies are set in the feedforward control unit 2. However, when two or more vibration-damping frequencies are set, likewise, it is possible to accurately estimate resonance frequencies and resonance attenuation coefficients of the control system and realize the vibration-damping control.

In that case, it is sufficient to increase the number of individual estimation processes according to the number of vibration-damping frequencies to be set and increase the number of resonance-signal computing elements of the signal-for-estimation computing unit 5a and the number of resonance-characteristic estimating computing elements of the resonance-characteristic estimating computing unit 4a according to the increase in the number of individual estimation processes to perform parallel computation.

In the above explanation, the estimation of the resonance characteristic is completed when the estimation result converges. However, it is also possible to continue the estimation of the resonance characteristic and perform correction of the vibration-damping control while causing the motor control device to operate.

In the above explanation, the process of estimating a resonance frequency and a resonance attenuation coefficient of the control system and setting both of a vibration-damping frequency and a vibration-damping attenuation coefficient of the feedforward control unit 2 is explained. However, although an effect of the vibration-damping control is inferior, a vibration-damping coefficient can be fixed for simplification. In that case, an attenuation coefficient of the control system does not have to be estimated.

In the above explanation, the resonance-signal computing elements 51a and 52a have the transfer characteristic represented by Formula (3). However, to eliminate the influence of noise and offset, a smooth transfer characteristic not having a pole or a zero that attenuation is a value equal to or smaller than 0.2 of a high-pass filter, a band-pass filter, or the like can be added to the transfer characteristic of Formula (3).

In the above explanation, a signal input to the signal-for-estimation computing unit 5a is a signal based on a signal input to the feedback control unit 3. However, a signal different from the signal input to the feedback control unit 3 can be used. For example, the same operation can be realized using an acceleration signal of the machine system 12 detected by an acceleration sensor attached to the machine system 12.

In the above explanation, the vibration-damping control is realized by performing the computation for reducing a signal component of a resonance frequency of the control system to the input of the position command signal X* in the feedforward control unit 2. However, a unit for performing computation for shaping the position command signal X* to prevent vibration from appearing in the position signal Xm can be provided instead of the feedforward control unit 2.

Third Embodiment

Figure 11:
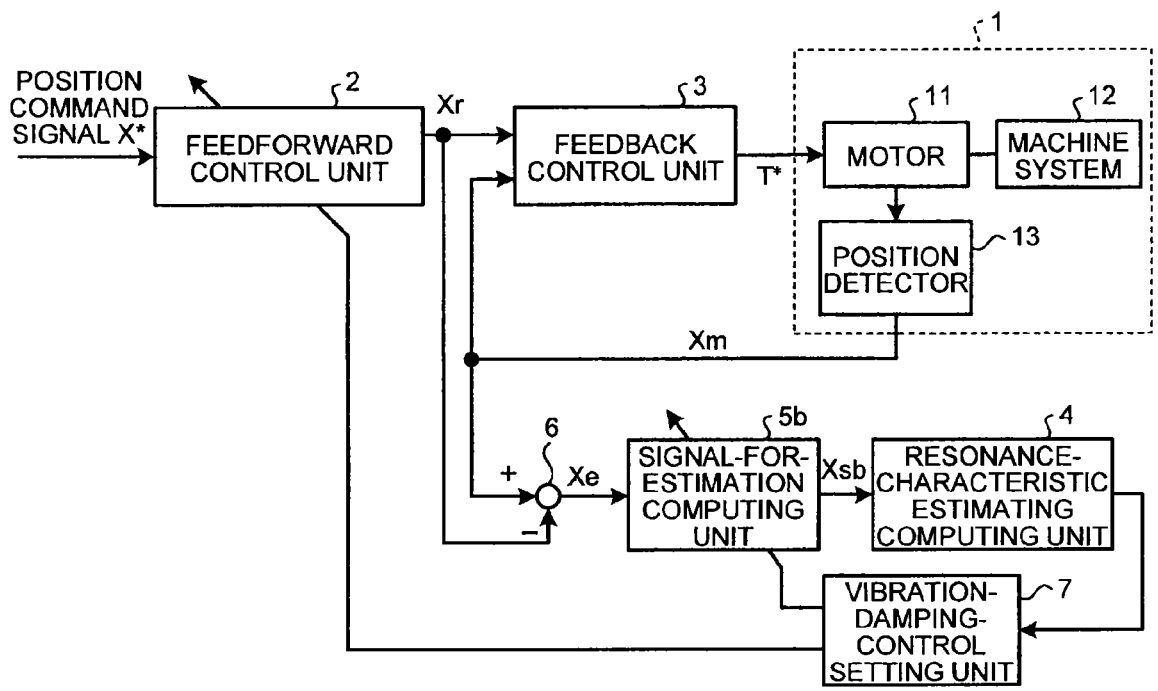
FIG. 11 is a block diagram of a schematic configuration of the motor control device according to a third embodiment of the present invention.

FIG. 11 is a block diagram of a schematic configuration of the motor control device according to a third embodiment of the present invention. In FIG. 11, the motor control device has a configuration in which the signal-for-estimation computing unit 5 of the motor control device according to the first embodiment is changed to a signal-for-estimation computing unit 5b. The other components have functions equivalent to the functions of the components of the motor control device according to the first embodiment.

Figure 12:
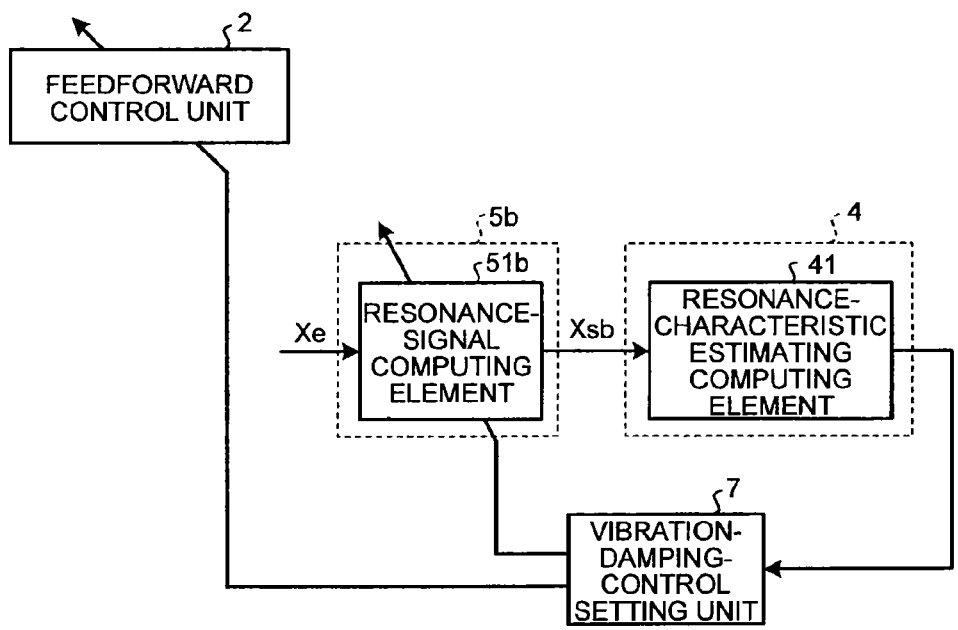
FIG. 12 is a block diagram of a configuration related to estimation of a resonance characteristic of a control system in the motor control device shown in FIG. 11.

FIG. 12 is a block diagram of a configuration related to an estimation of resonance characteristic of a control system in the motor control device shown in FIG. 11. In FIG. 12, the signal-for-estimation computing unit 5b includes a signal-for-estimation computing element 51b. To eliminate the influence of noise and offset from the vibration signal Xe, the signal-for-estimation computing element 51b outputs a signal for estimation Xsb by performing computation based on a smooth transfer characteristic not having a pole or a zero that attenuation value is equal to or smaller than 0.2 of a high-pass filter, a band-pass filter, or the like. The resonance-characteristic estimating computing unit 4 includes the resonance-characteristic estimating computing element 41 as in the first embodiment. The resonance-characteristic estimating computing unit 4 estimates a resonance characteristic of the control system from a vibration component included in the signal for estimation Xsb.

Figure 13:
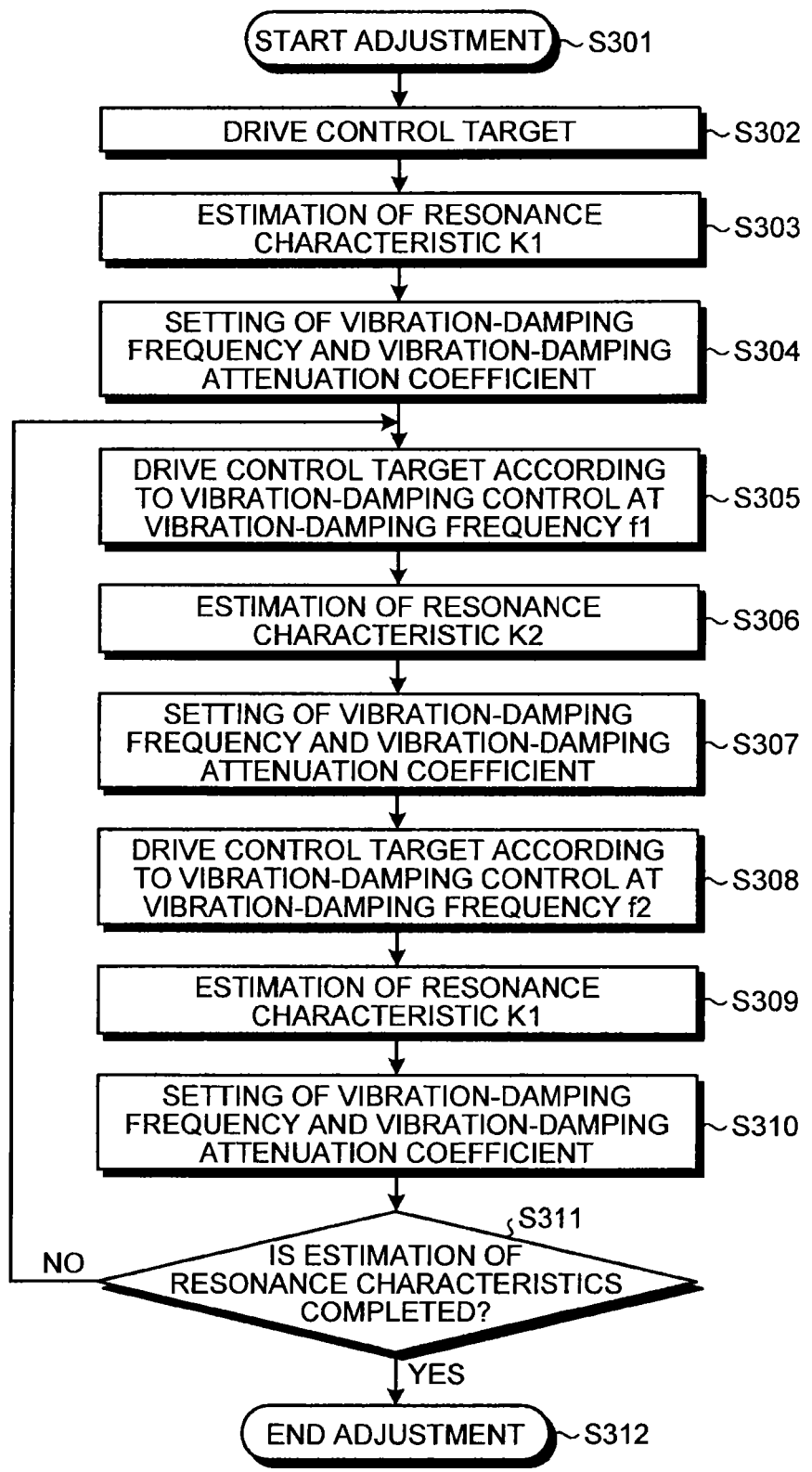
FIG. 13 is a flowchart for explaining a vibration-damping control automatic adjusting method of the motor control device shown in FIG. 11.

FIG. 13 is a flowchart for explaining a vibration-damping control automatic adjusting method of the motor control device shown in FIG. 11. In FIG. 13, in the motor control device in an initial state, setting of vibration-damping control by the feedforward control unit 2 is not performed. Therefore, the computation of the vibration-damping control is disabled and the adjustment of the vibration-damping control and the computation is started (step S301).

When the controlled object 1 is driven according to a first input of the position command signal X*, because the vibration-damping control by the feedforward control unit 2 is disabled, vibration due to a resonance characteristic of the control system appears in the vibration signal Xe and the signal for estimation Xsb output by the signal-for-estimation computing unit 5b (step S302).

The resonance-characteristic estimating computing element 41 estimates a resonance frequency and a resonance attenuation coefficient of the control system from the signal for estimation Xsb and sets a result of the estimation as the resonance frequency c1 and the resonance attenuation coefficient e1 of the resonance characteristic K1 of the control system (step S303).

The vibration-damping-control setting unit 7 stores the estimated resonance frequency c1 and the estimated resonance attenuation coefficient e1 of the control system as the candidate frequency c1' and the candidate attenuation coefficient e1', sets the vibration-damping frequency f1 and the vibration-damping attenuation coefficient h1 of the feedforward control unit 2 to coincide with the candidate frequency c1' and the candidate attenuation coefficient e1' to generate, for a next input of the position command signal X*, the signal for estimation Xsb in which only the signal component of the resonance frequency c1 of the estimation result is reduced, and enables the vibration-damping control at the vibration-damping frequency f1 by the feedforward control unit 2 (step S304).

When the controlled object 1 is driven according to a second input of the position command signal X*, according to the vibration-damping control at the vibration-damping frequency f1 in the feedforward control unit 2, the signal for estimation Xsb changes to a waveform in which the vibration of the resonance frequency c1 is suppressed (step S305).

The resonance-characteristic estimating computing element 41 estimates the resonance frequency c2 and the resonance attenuation coefficient e2 of the resonance characteristic K2 of the control system from the signal for estimation Xsb (step S306).

The vibration-damping-control setting unit 7 stores the estimated resonance frequency c2 and the estimated resonance attenuation coefficient e2 of the control system as the candidate frequency c2' and the candidate attenuation coefficient e2', sets the vibration-damping frequency f2 and the vibration-damping attenuation coefficient h2 of the feedforward control unit 2 to coincide with the candidate frequency c2' and the candidate attenuation coefficient e2' to generate, for the next input of the position command signal X*, the signal for estimation Xsb in which only the signal component of the resonance frequency c2 of the estimation result is reduced, and enables vibration-damping control at the vibration-damping frequency f2 by the feedforward control unit 2. On the other hand, the vibration-damping-control setting unit 7 disables vibration-damping control at the vibration-damping frequency f1 (step S307).

When the controlled object 1 is driven according to a third input of the position command signal X*, according to the vibration-damping control at the vibration-damping frequency f2 in the feedforward control unit 2, the signal for estimation Xsb changes to a waveform in which the vibration of the resonance frequency c2 is suppressed (step S308).

The resonance-characteristic estimating computing element 41 estimates the resonance frequency c1 and the resonance attenuation coefficient e1 in the resonance characteristic K1 of the control system from the signal for estimation Xsb (step S309). The vibration-damping-control setting unit 7 updates the candidate frequency c1' and the candidate attenuation coefficient e1' from the estimated resonance frequency c1 and the estimated resonance attenuation coefficient e1 of the control system, updates the vibration-damping frequency f1 and the vibration-damping attenuation coefficient h1 of the feedforward control unit 2 to coincide with the candidate frequency c1' and the candidate attenuation coefficient e1' to generate, for a next input of the position command signal X*, the signal for estimation Xsb in which only the signal component of the resonance frequency c1 of the estimation result is reduced, and enables vibration-damping control at the vibration-damping frequency f1 by the feedforward control unit 2. On the other hand, the vibration-damping-control setting unit 7 disables vibration-damping control at the vibration-damping frequency f2 (step S310).

When the resonance frequency c1 and the resonance attenuation coefficient e1 and the resonance frequency c2 and the resonance attenuation coefficient e2 of the control system of an estimation result are values equivalent to the last estimation result, i.e., the estimation result converges, the estimation of the resonance characteristic is completed.

When the estimation of the resonance characteristic K1 and the resonance characteristic K2 is not performed two or more times or the estimation result does not converge, the operations from step S305 are repeated (step S311). When the estimation of the resonance characteristic is completed, the vibration-damping-control setting unit 7 sets the vibration-damping frequency f1 and the vibration-damping attenuation coefficient h1 of the feedforward control unit 2 to coincide with the candidate frequency c1' and the candidate attenuation coefficient e1', sets the vibration-damping frequency f2 and the vibration-damping attenuation coefficient h2 of the feedforward control unit 2 to coincide with the candidate frequency c2' and the candidate attenuation coefficient e2', and ends the adjustment of the vibration-damping control (step S312).

The driving of the controlled object 1 in the waveform of the position deviation shown in FIG. 4 can be realized by performing the vibration-damping control based on the estimation result by the method described above.

In the vibration-damping control automatic adjusting method according to the third embodiment of the present invention, steps S305 to S307 are an individual estimation process for the resonance characteristic K2 of the control system. Steps S308 to S310 are an individual estimation process for the resonance characteristic K1 of the control system.

In the individual estimation process for the resonance characteristic K1 of the control system, by using the signal for estimation Xsb in which the vibration of the resonance frequency c2 of the control system is suppressed, it is possible to perform an accurate estimation by suppressing an interference due to the vibration of the resonance frequency c2 of the control system.

In the individual estimation process for the resonance characteristic K2 of the control system, by using the signal for estimation Xsb in which the vibration of the resonance frequency c1 of the control system is suppressed, it is possible to perform an accurate estimation by suppressing an interference due to the vibration of the resonance frequency c1 of the control system.

In the motor control device according to the third embodiment of the present invention, it is possible to realize vibration-damping control for suppressing the vibrations of the resonance frequency c1 and the resonance frequency c2 of the control system.

In the above explanation, the two vibration-damping frequencies are set in the feedforward control unit 2. However, when two or more vibration-damping frequencies are set, likewise, it is possible to accurately estimate a resonance frequency and a resonance attenuation coefficient of the control system and realize the vibration-damping control. In that case, it is sufficient to increase the number of individual estimation processes according to the number of vibration-damping frequencies to be set and repeat a sequential execution of the individual estimation processes.

In the above explanation, the change of the resonance frequency to be estimated is performed every time the position command signal X*, which is an operation command, is input. However, the change of the resonance frequency to be estimated can be performed every few inputs of the position command signal X*. In the above explanation, the change of the resonance frequency to be estimated is performed according to the input of the position command signal X*. However, the change of the resonance frequency to be estimated can be performed according to a time or a position.

In the above explanation, the designation of the candidate frequency is performed after the estimation for one input of the position command signal X* ends. However, the next designation of the candidate frequency can be performed after a same resonance frequency is estimated for few continuous inputs of the position command signal X*. In the above explanation, the designation of the candidate frequency is performed according to the input of the position command signal X*. However, the designation of the candidate frequency can be performed according to a change in a time or a position.

In the above explanation, to eliminate the influence of noise and offset, the signal-for-estimation computing element 51b has the transfer function of a high-pass filter, a band-pass filter, or the like. However, the vibration signal Xe to the signal for estimation Xsb can be directly transferred. The estimation of a resonance characteristic of the control system can be performed with a configuration in which the signal-for-estimation computing unit 5b is omitted. In that case, a calculation load can be reduced.

In the above explanation, the signal input to the resonance-characteristic estimating computing unit 4 is a signal based on the signal input to the feedback control unit 3. However, a signal different from the signal input to the feedback control unit 3 can be used. The same operation can be realized using, for example, an acceleration signal or the like of the machine system 12 detected by an acceleration sensor attached to the machine system 12.

In the above explanation, the vibration-damping control is realized by performing the computation for reducing a signal component of a resonance frequency of the control system to the input of the position command signal X* in the feedforward control unit 2. However, a unit for shaping the position command signal X* to prevent vibration from appearing in the position signal Xm can be provided instead of the feedforward control unit 2.

Fourth Embodiment

Figure 14:
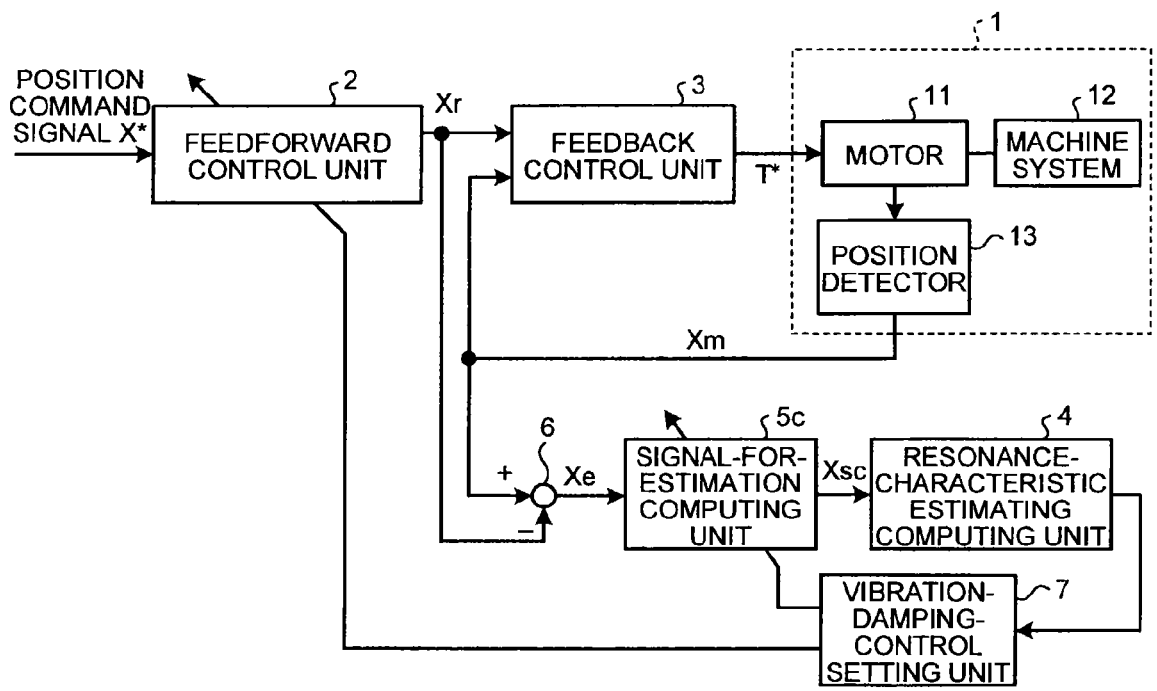
FIG. 14 is a block diagram of a schematic configuration of the motor control device according to a fourth embodiment of the present invention.

FIG. 14 is a block diagram of a schematic configuration of the motor control device according to a fourth embodiment of the present invention. In FIG. 14, the motor control device has a configuration in which the signal-for-estimation computing unit 5 of the motor control device according to the first embodiment is changed to a signal-for-estimation computing unit 5c. The other components have functions equivalent to the functions of the components of the motor control device according to the first embodiment.

Figure 15:
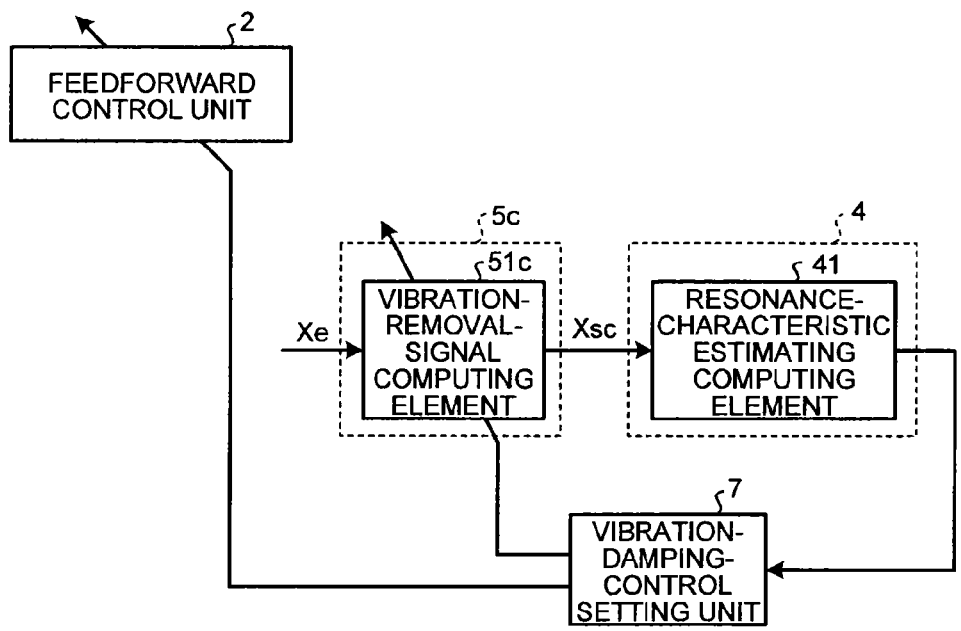
FIG. 15 is a block diagram of a configuration related to estimation of a resonance characteristic of a control system in the motor control device shown in FIG. 14.

FIG. 15 is a block diagram of a configuration related to estimation of a resonance characteristic of a control system in the motor control device shown in FIG. 14. In FIG. 15, the signal-for-estimation computing unit 5c includes a vibration-removal-signal computing element 51c. The vibration-removal-signal computing element 51c computes a signal for estimation Xsc according to the vibration signal Xe obtained by subtracting the position signal Xm from the vibration-damping position command signal Xr.

Estimation of a resonance frequency and a resonance attenuation coefficient of the control system is explained.

The vibration-removal-signal computing element 51c receives an input of the vibration signal Xe and outputs the signal for estimation Xsc according to computation of a transfer function Fs(s) represented by Formula (4) using a set of a set vibration removal frequency and a set vibration removal attenuation coefficient "ωm_j, ζm_j" (j=1, 2, . . . , and N−1).

$$Fs(s) = \frac{\prod_{j=1}^{N-1}(\omega m\_j^{-2} \cdot s^2 + 2\zeta m\_j \cdot \omega m\_j^{-1} \cdot s + 1)}{a_{2N-2} \cdot s^{2N-2} + a_{2N-3} \cdot s^{2N-3} + L + a_1 \cdot s + 1} \quad (4)$$

Appropriate constants are set for $a_{2N-2}, a_{2N-3}, \ldots,$ and $a_1$.

The transfer function Fs(s) of Formula (4) represents a characteristic for reducing a signal component of a set vibration removal frequency. The vibration-removal-signal computing element 51c reduces the signal component of the vibration removal frequency with respect to the vibration signal Xe and outputs the signal for estimation Xsc.

The resonance-characteristic estimating computing unit 4 receives an input of the signal for estimation Xsc and estimates a resonance frequency and a resonance attenuation coefficient of the control system using an identification method such as a least squares method.

As explained above the motor control device according to the fourth embodiment can accurately estimate a resonance frequency and a resonance attenuation coefficient of the control system and suppress vibration of the resonance frequency appearing in the position signal Xm with respect to the position command signal X*.

The resonance-characteristic estimating computing unit 4 sometimes cannot obtain an accurate estimation result only by performing the estimation operation for a resonance characteristic of the control system for one input of the position command signal X*. Therefore, to improve an estimation accuracy of a resonance characteristic, the motor control device repeats the estimation operation for a resonance characteristic of one control system a plurality of times.

Figure 16:
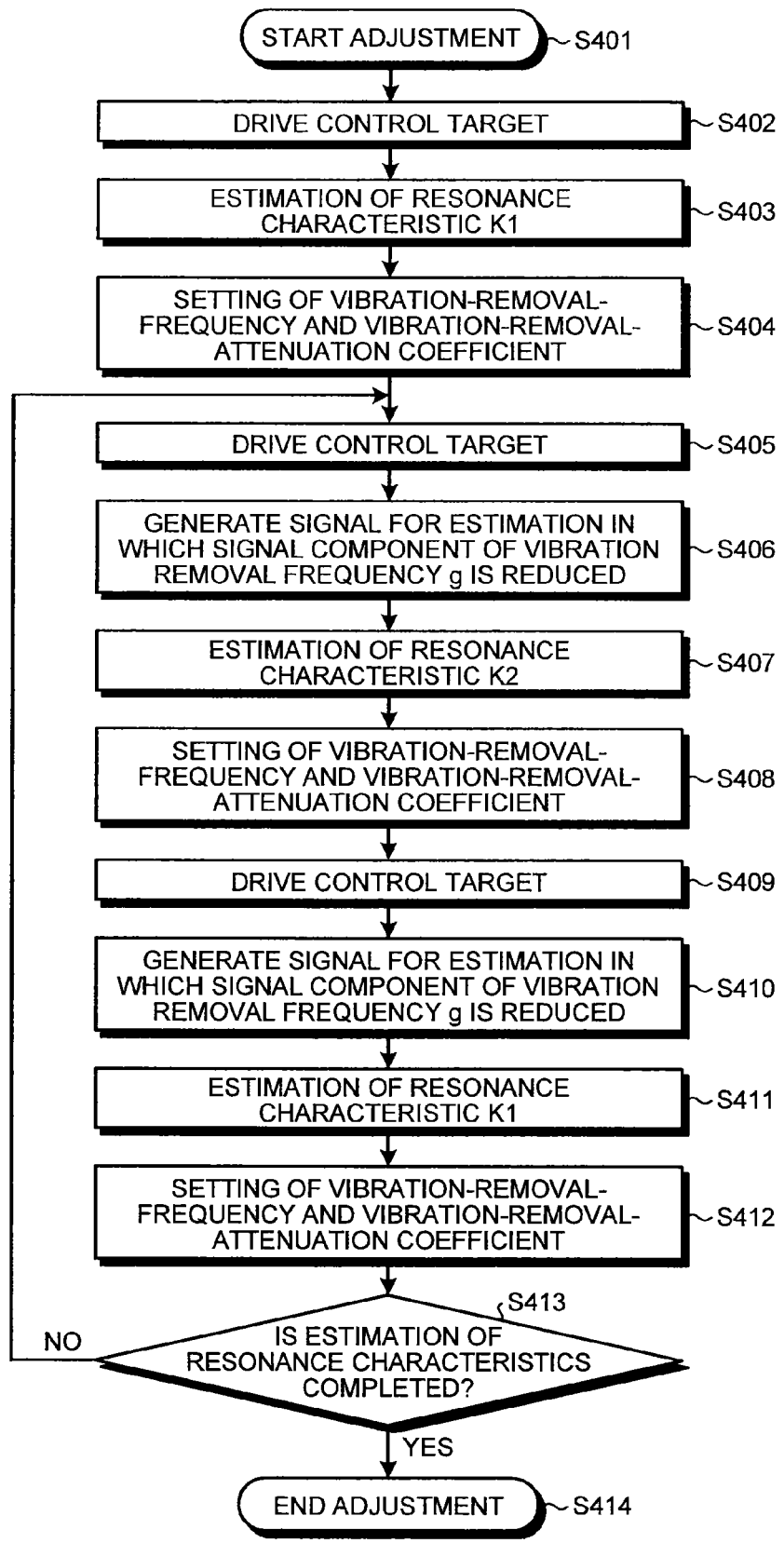
FIG. 16 is a flowchart for explaining a vibration-damping automatic adjusting method of the motor control device shown in FIG. 14.

FIG. 16 is a flowchart for explaining a vibration-damping automatic adjusting method of the motor control device shown in FIG. 14. In FIG. 16, a vibration-damping control computation of the feedforward control unit 2 is disabled during the vibration control automatic adjustment. In an initial state, setting of computation based on Formula (4) by the vibration-removal-signal computing element 51c of the signal-for-estimation computing unit 5c is not performed. Therefore, the vibration-damping control and the computation based on Formula (4) are disabled and the adjustment of the vibration-damping control and the computation is started (step S401).

When the controlled object 1 is driven according to a first input of the position command signal X*, because the vibration-damping control by the feedforward control unit 2 is disabled, a vibration due to a resonance characteristic of the control system appears in the vibration signal Xe (step S402).

Because the computation based on Formula (4) is disabled, the vibration-removal-signal computing element 51c outputs the signal for estimation Xsc that coincides with the vibration signal Xe. The resonance-characteristic estimating computing element 41 estimates a resonance characteristic of the control system from the signal for estimation Xsc and sets a result of the estimation as the resonance frequency c1 and the resonance attenuation coefficient e1 of the resonance characteristic K1 of the control system (step S403).

The vibration-damping-control setting unit 7 stores the estimated resonance frequency c1 and the estimated resonance attenuation coefficient e1 of the control system as the candidate frequency c1' and the candidate attenuation coefficient e1'. The vibration-damping-control setting unit 7 sets, for a next input of the position command signal X*, to output the signal for estimation Xsc in which only a signal component of the estimated resonance frequency c1 is reduced, a vibration removal frequency g1 and a vibration removal attenuation coefficient i1 of the vibration-removal-signal computing element 51c to coincide with the candidate frequency c1' and the candidate attenuation coefficient e1' and enables the computation based on Formula (4) at the vibration removal frequency g1, for the vibration-removal-signal computing element 51c (step S404).

When the controlled object 1 is driven according to a second input of the position command signal X*, a vibration due to a resonance characteristic of the control system appears in the vibration signal Xe (step S405).

The vibration-removal-signal computing element 51c outputs the signal for estimation Xsc in which a signal component of a vibration removal frequency g1 is reduced according to the vibration signal Xe (step S406). Because vibration of the resonance frequency c1 of the control system is suppressed in the signal for estimation Xsc, the resonance-characteristic estimating computing element 41 estimates the resonance frequency c2 and the resonance attenuation coefficient e2 of the resonance characteristic K2 of the control system from the signal for estimation Xsc (step S407).

The vibration-damping-control setting unit 7 stores the estimated resonance frequency C2 and the resonance attenuation coefficient e2 as the candidate frequency C2' and the candidate attenuation coefficient e2', sets, for a next input of the position command signal X*, to output the signal for estimation Xsc in which only the signal component of the estimated resonance frequency c2 is reduced, the vibration removal frequency g2 and a vibration removal attenuation coefficient i2 of the vibration-removal-signal computing element 51c to coincide with the candidate frequency c2' and the candidate attenuation coefficient e2' and enables the computation based on Formula (4) at the vibration removal frequency g2 of the vibration-removal-signal computing element 51c. (step S408).

When the controlled object 1 is driven according to a third input of the position command signal X*, vibration due to the resonance characteristic of the control system appears in the vibration signal Xe (step S409).

The vibration-removal-signal computing element 51c outputs the signal for estimation Xsc in which a signal component of the vibration removal frequency g2 is reduced according to the vibration signal Xe (step S410). Because the vibration of the resonance frequency c2 of the control system is suppressed in the signal for estimation Xsc, the resonance-characteristic estimating computing element 41 estimates the resonance frequency c1 and the resonance attenuation coefficient e1 in the resonance characteristics K1 of the control system from the signal for estimation Xsc (step S411).

The vibration-damping-control setting unit 7 updates the candidate frequency c1' and the candidate attenuation coefficient e1' from the estimated resonance frequency c1 and the estimated resonance attenuation coefficient e1 of the control system. The vibration-damping-control setting unit 7 sets, for the next input of the position command signal X*, to output the signal for estimation Xsc, which is a signal in which only the signal component of the estimated resonance frequency c1 is reduced, the vibration removal frequency g1 and the vibration removal attenuation coefficient i1 of the vibration-removal-signal computing element 51c to coincide with the candidate frequency e1' and the candidate attenuation coefficient e1' and enables the computation based on Formula (4) at the vibration removal frequency g1 for the vibration-removal-signal computing element 51c (step S412).

When the resonance frequency c1 and the resonance attenuation coefficient e1 and the resonance frequency c2 and the resonance attenuation coefficient e2 of the control system of an estimation result are values equivalent to those of the last estimation result, i.e., the estimation result converges, the estimation of the resonance characteristic is completed.

When the estimation of the resonance characteristic K1 and the resonance characteristic K2 is not performed two or more times or the estimation result does not converge, the operations from step S405 are repeated (step S413). When the estimation of the resonance characteristic is completed, the vibration-damping-control setting unit 7 sets the vibration-damping frequency f1 and the vibration-damping attenuation coefficient h1 of the feedforward control unit 2 to coincide with the candidate frequency c1' and the candidate attenuation coefficient e1', sets the vibration-damping frequency f2 and the vibration-damping attenuation coefficient h2 of the feedforward control unit 2 to coincide with the candidate frequency c2' and the candidate attenuation coefficient e2', and ends the adjustment of the vibration-damping control (step S414).

The driving of the controlled object 1 in the waveform of the position deviation shown in FIG. 4 can be realized by performing the vibration-damping control based on the estimation result by the method described above.

In the vibration-damping control automatic adjusting method according to the fourth embodiment of the present invention, steps S406 to S407 are an individual estimation process for the resonance characteristic K2 of the control system. Steps S410 to S411 are an individual estimation process for the resonance characteristic K1 of the control system.

By repeating a change of the individual estimation processes, concerning the estimation of the resonance frequency c1 and the resonance attenuation coefficient e1 of the control system, it is possible to use the signal for estimation Xsc in which the vibration of the resonance frequency c2 of the control system is suppressed. It is possible to suppress an interference due to the vibration of the resonance frequency c2 of the control system and accurately estimate the resonance frequency c1 and the resonance attenuation coefficient e1.

Concerning the resonance frequency c2 and the resonance attenuation coefficient e2 of the control system, accurate estimation is also possible because a estimation computation is performed from the signal for estimation Xsc in which the vibration of the resonance frequency c1 of the control system is suppressed. In the motor control device according to the fourth embodiment of the present invention, it is possible to realize a vibration-damping control for suppressing the vibration of the resonance frequency c1 and the resonance frequency c2 of the control system.

In the above explanation, the two vibration-damping frequencies are set in the feedforward control unit 2. However, when two or more vibration-damping frequencies are set, likewise, it is possible to accurately estimate a resonance frequency and a resonance attenuation coefficient of the control system and realize the vibration-damping control. In that case, it is sufficient to increase the number of individual estimation processes according to the number of vibration-damping frequencies to be set and repeat a sequential execution of the individual estimation processes.

In the above explanation, the designation of the candidate frequency is performed after the estimation for the first input of the position command signal X* ends. However, the next designation of a candidate frequency can be performed after the same resonance characteristic is estimated for a plurality of times of continuous input of the position command signal X*. Further, in the above explanation, the designation of the candidate frequency is performed according to the input of the position command signal X*. However, the designation of the candidate frequency can be performed according to a change in time or a position.

In the above explanation, the individual estimation processes are realized by inputting the position command signal X*, which is an operation command, a plurality of times. However, it is also possible to store, as wave form data, a waveform of the vibration signal Xe obtained when the position command signal X* is input once and realize the individual estimation processes by using the stored waveform data. In that case, steps S405 and S409 can be omitted from the steps shown in the flowchart of FIG. 16.

In the above explanation, the process of estimating a resonance frequency and a resonance attenuation coefficient of the control system and setting both of a vibration-damping frequency and a vibration-damping attenuation coefficient of the feedforward control unit 2 is explained. However, although an effect of the vibration-damping control is inferior, a vibration-damping coefficient can be fixed for simplification. In that case, an attenuation coefficient of the control system does not have to be estimated.

In the above explanation, the vibration-removal-signal computing element 51c has the transfer characteristic represented by Formula (4). However, to eliminate the influence of noise and offset, a smooth transfer characteristic not having a minimum point where attenuation is a value equal to or smaller than 0.2 or a "zero" of a high-pass filter, a band-pass filter, or the like can be added to the transfer characteristic of Formula (4).

In the above explanation, a signal input to the signal-for-estimation computing unit 5c is a signal based on a signal input to the feedback control unit 3. However, a signal different from the signal input to the feedback control unit 3 can be used. For example, the same operation can be realized using an acceleration signal of the machine system 12 detected by an acceleration sensor attached to the machine system 12.

In the above explanation, the vibration-damping control is realized by performing the computation for reducing a signal component of a resonance frequency of the control system to the input of the position command signal X* in the feedforward control unit 2. However, a unit for shaping the position command signal X* to prevent vibration from appearing in the position signal Xm can be provided instead of the feedforward control unit 2.

Fifth Embodiment

Figure 17:
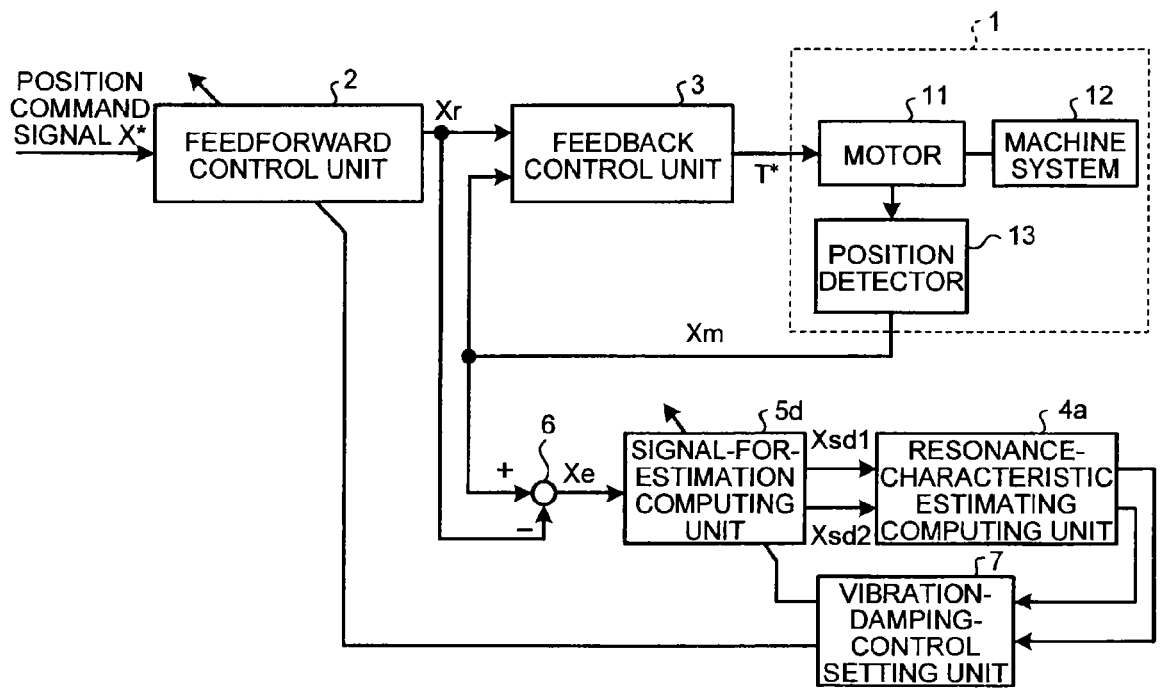
FIG. 17 is a block diagram of a schematic configuration of the motor control device according to a fifth embodiment of the present invention.

FIG. 17 is a block diagram of a schematic configuration of the motor control device according to a fifth embodiment of the present invention. In FIG. 17, the motor control device has a configuration in which the signal-for-estimation computing unit 5a of the motor control device according to the second embodiment is changed to a signal-for-estimation computing unit 5d. The other components have functions equivalent to the functions of the components of the motor control device according to the second embodiment.

Figure 18:
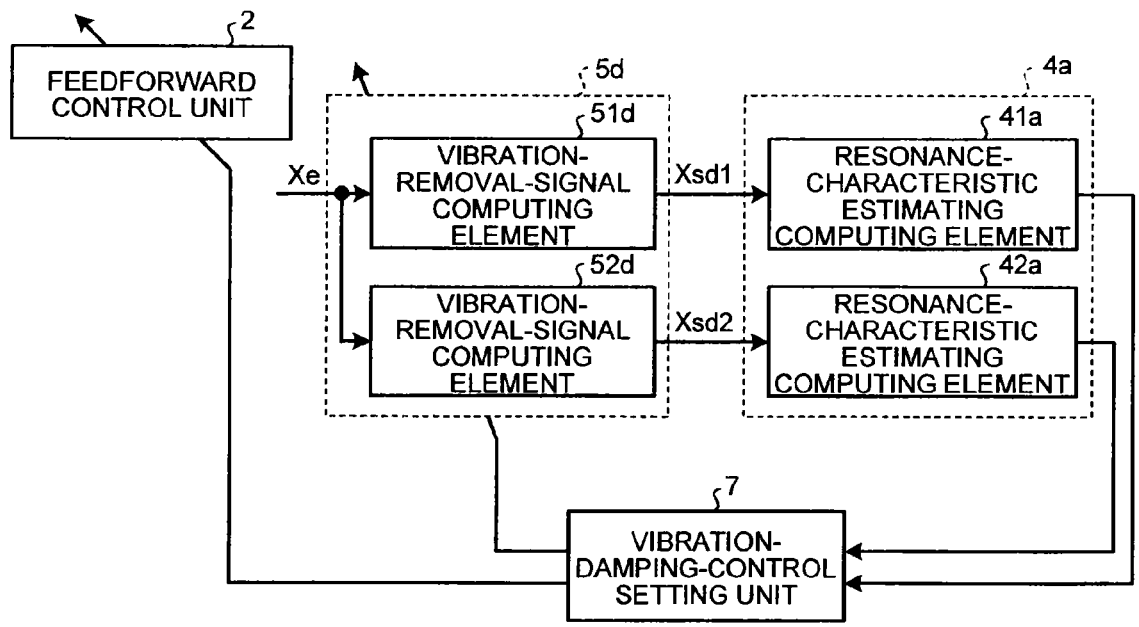
FIG. 18 is a block diagram of a configuration related to estimation of a resonance characteristic of a control system in the motor control device shown in FIG. 17.

FIG. 18 is a block diagram of a configuration related to estimation of a resonance characteristic of a control system in the motor control device shown in FIG. 17. In FIG. 18, the signal-for-estimation computing unit 5d includes vibration-removal-signal computing elements 51d and 52d. The vibration-removal-signal computing elements 51d and 52d respectively compute signals for estimation Xsd1 and Xsd2 according to the vibration signal Xe obtained by subtracting the position signal Xm from the vibration-damping position command signal Xr.

The vibration-removal-signal computing elements 51d and 52d have a function equivalent to the function of the vibration-removal-signal computing element 51c in the fourth embodiment. The vibration-removal-signal computing elements 51d and 52d reduce, according to the computation based on Formula (4), a signal component of a vibration removal frequency set for the vibration signal Xe and respectively output the signals for estimation Xsd1 and Xsd2.

Figure 19:
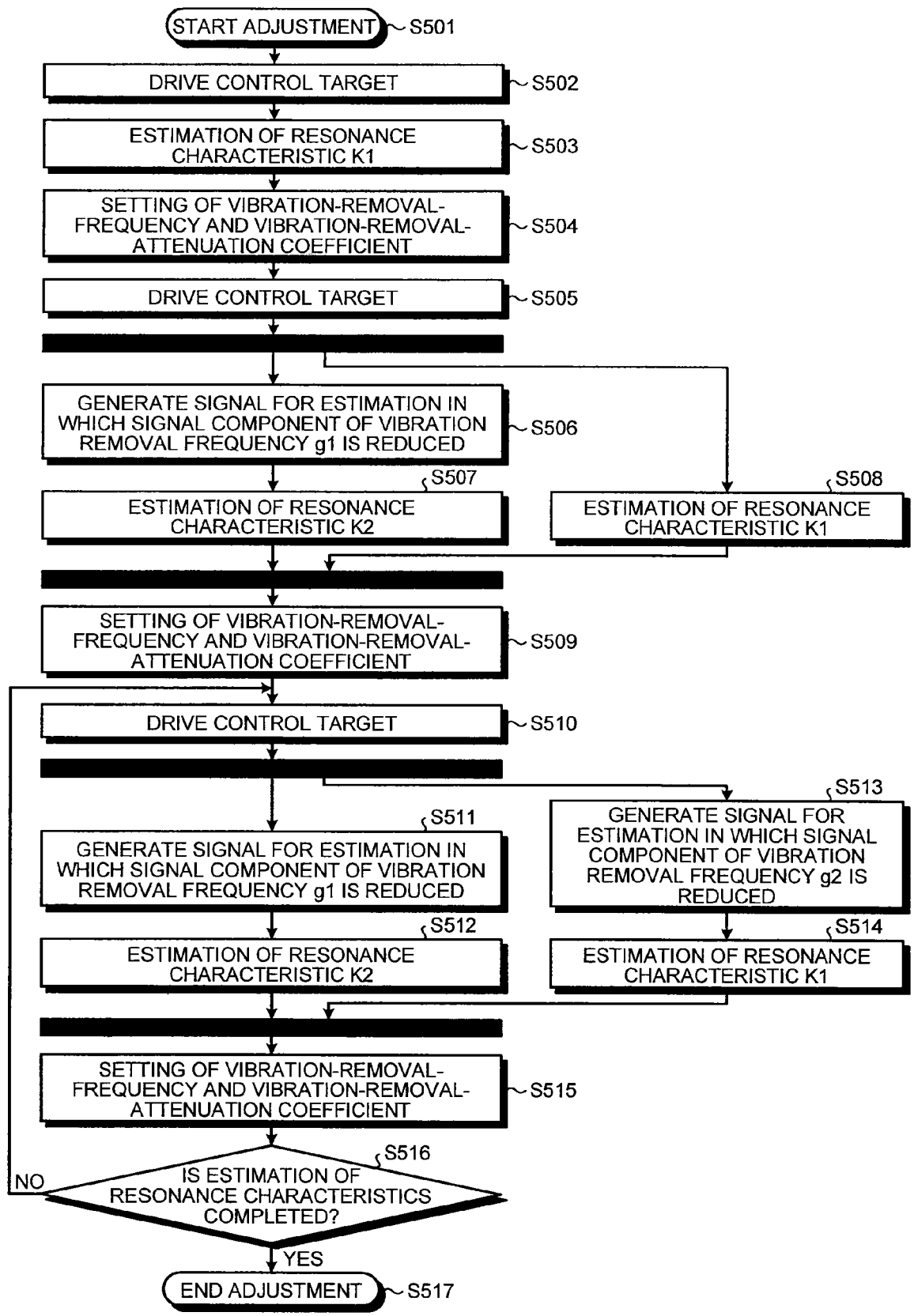
FIG. 19 is a flowchart for explaining a vibration-damping control automatic adjusting method of the motor control device shown in FIG. 17.

FIG. 19 is a flowchart for explaining a vibration-damping control automatic adjusting method of the motor control device shown in FIG. 17. In FIG. 19, vibration-damping computation of the feedforward control unit 2 is disabled during vibration-damping control automatic adjustment. In an initial state, the computation based on Formula (4) by the vibration-removal-signal computing element 51d and the vibration-removal-signal computing element 52d of the signal-for-estimation computing unit 5d is disabled and an adjustment of the computation is started (step S501).

When the controlled object 1 is driven according to a first input of the position command signal X*, because the vibration-damping control by the feedforward control unit 2 is disabled, a vibration due to a resonance characteristic of the control system appears in the vibration signal Xe (step S502).

Because the computation based on Formula (4) is disabled, the vibration-removal-signal computing elements 51d and 52d of the signal-for-estimation computing unit 5d respectively output the signals for estimation Xsd1 and Xsd2 that coincide with the vibration signal Xe. The resonance-characteristic estimating computing unit 4a estimates a resonance characteristic of the control system from the signals for estimation Xsd1 and Xsd2.

The signals for estimation Xsd1 and Xsd2 are signals having the same characteristic. Therefore, an estimation result of the resonance-characteristic estimating computing unit 4a is one kind. The estimation result at this point is set as the resonance frequency c1 and the resonance attenuation coefficient e1 of the resonance characteristic K1 of the control system (step S503).

The vibration-damping-control setting unit 7 stores the estimated resonance frequency c1 and the estimated resonance attenuation coefficient e1 of the control system as the candidate frequency c1' and the candidate attenuation coefficient e1', sets, for a next input of the position command signal X*, to output the signal for estimation Xsd1, in which only the signal component of the estimated resonance frequency c1 is reduced, the vibration removal frequency g1 and the vibration removal attenuation coefficient i1 of the vibration-removal-signal computing element 51d of the signal-for-estimation computing unit 5d to coincide with the candidate frequency c1' and the candidate attenuation coefficient e1', and enables the computation based on Formula (4) at the vibration removal frequency g1. On the other hand, the vibration-removal-signal computing element 52d of the signal-for-estimation computing unit 5d maintains the disabling of the computation based on Formula (4) (step S504).

When the controlled object 1 is driven according to a second input of the position command signal X*, a vibration due to a resonance characteristic of the control system appears in the vibration signal Xe (step S505).

The vibration-removal-signal computing element $51d$ of the signal-for-estimation computing unit $5d$ outputs the signal for estimation Xsd1 in which the signal component of the vibration removal frequency g1 is reduced according to the vibration signal Xe (step S506). Because vibration of the resonance frequency c1 of the control system is suppressed in the signal for estimation Xsd1, the resonance-characteristic estimating computing element $41a$ of the resonance-characteristic estimating computing unit $4a$ estimates the resonance frequency c2 and the resonance attenuation coefficient e2 of the resonance characteristic K2 of the control system (step S507).

Because the computation based on Formula (4) is disabled, the vibration-removal-signal computing element $52d$ of the signal-for-estimation computing unit $5d$ outputs the signal for estimation Xsd2 that coincides with the vibration signal Xe. The resonance-characteristic estimating computing element $42a$ of the resonance-characteristic estimating computing unit $4a$ estimates the resonance frequency c1 and the resonance attenuation coefficient e1 in the resonance characteristic K1 of the control system from the signal for estimation Xsd2 (step S508).

The vibration-damping-control setting unit 7 updates the candidate frequency c1' and the candidate attenuation coefficient e1' to coincide with the estimated resonance frequency c1 and the estimated resonance attenuation coefficient e1 of the control system. Further, the vibration-damping-control setting unit 7 stores the candidate frequency c2' and the candidate attenuation coefficient e2' to coincide with the estimated resonance frequency c2 and the estimated resonance attenuation coefficient e2. The vibration-damping-control setting unit 7 updates, for a next input of the position command signal X*, to output the signal for estimation Xsd1 in which only the signal component of the estimated resonance frequency c1 is reduced, the vibration removal frequency g1 and the vibration removal attenuation coefficient i1 of the vibration-removal-signal computing element $51d$ to coincide with the candidate frequency c1' and the candidate attenuation coefficient e1'. For the vibration-removal-signal computing element $52d$, the vibration-damping-control setting unit 7 sets, to output the signal for estimation Xsd2 in which only the signal component of the resonance frequency c2 is reduced, the vibration removal frequency g2 and the vibration removal attenuation coefficient i2 to coincide with the candidate frequency c2' and the candidate attenuation coefficient e2' and enables the computation based on Formula (4) at the vibration removal frequency g2 (step S509).

When the controlled object 1 is driven according to a third input of the position command signal X*, a vibration due to the resonance characteristic of the control system appears in the vibration signal Xe (step S510).

The vibration-removal-signal computing element $51d$ outputs the signal for estimation Xsd1 in which a signal component of the vibration removal frequency g1 is reduced according to the vibration signal Xe (step S511). Because the vibration of the resonance frequency c1 of the control system is suppressed in the signal for estimation Xsd1, the resonance-characteristic estimating computing element $41a$ estimates the resonance frequency c2 and the resonance attenuation coefficient e2 in the resonance characteristic K2 of the control system (step S512).

The vibration-removal-signal computing element $52d$ outputs the signal for estimation Xsd2 in which a signal component of the vibration removal frequency g2 is reduced according to the vibration signal Xe (step S513). Because the vibration of the resonance frequency c2 of the control system is suppressed in the signal for estimation Xsd2, the resonance-characteristic estimating computing element $42a$ estimates the resonance frequency c1 and the resonance attenuation coefficient e1 in the resonance characteristic K1 of the control system from the signal for estimation Xsd2 (step S514).

The vibration-damping-control setting unit 7 updates the candidate frequencies c1' and c2' and the candidate attenuation coefficients e1' and e2' to coincide with the estimated resonance frequencies c1 and c2 and the estimated resonance attenuation coefficients e1 and e2 of the control system. The vibration-damping-control setting unit 7 updates, for a next input of the position command signal X*, to output the signal for estimation Xsd1 in which only the signal component of the estimated resonance frequency c1 is reduced and the signal for estimation Xsd2 in which only the signal component of the estimated resonance frequency c2 is reduced, the vibration removal frequency g1 and the vibration removal attenuation coefficient i1 of the vibration-removal-signal computing element $51d$ to coincide with the candidate frequency c1' and the candidate attenuation coefficient e1'. For the vibration-removal-signal computing element $51d$, the vibration-damping-control setting unit 7 sets the vibration removal frequency g2 and the vibration removal attenuation coefficient i2 to coincide with the candidate frequency c2' and the candidate attenuation coefficient e2' (step S515).

When the resonance frequency c1 and the resonance attenuation coefficient e1 and the resonance frequency c2 and the resonance attenuation coefficient e2 of the control system of an estimation result are values equivalent to those of the last estimation result, i.e., the estimation result converges, the estimation of the resonance characteristic is completed.

When the estimation result does not converge, the operation from step S510 is repeated (step S516). When the estimation of the resonance characteristic is completed, the vibration-damping-control setting unit 7 sets the vibration-damping frequency f1 and the vibration-damping attenuation coefficient h1 of the feedforward control unit 2 to coincide with the candidate frequency c1' and the candidate attenuation coefficient e1', sets the vibration-damping frequency f2 and the vibration-damping attenuation coefficient h2 of the feedforward control unit 2 to coincide with the candidate frequency c2' and the candidate attenuation coefficient e2', and ends the adjustment of the vibration-damping control (step S517).

The driving of the controlled object 1 in the waveform of the position deviation shown in FIG. 4 can be realized by performing the vibration-damping control based on the estimation result by the method explained above.

In the vibration-damping control automatic adjusting method according to the fifth embodiment of the present invention, steps S511 to S512 are an individual estimation process for the resonance characteristic K2 of the control system. Steps S513 to S514 are an individual estimation process for the resonance characteristic K1 of the control system.

In the individual estimation process for the resonance characteristic K1 of the control system, by using the signal for estimation Xsd2 in which the vibration of the resonance frequency c2 of the control system is suppressed, it is possible to perform accurate estimation with an interference due to the vibration of the resonance frequency c2 of the control system suppressed.

In the individual estimation process for the resonance characteristic K2 of the control system, by using the signal for estimation Xsd1 in which the vibration of the resonance frequency c1 of the control system is suppressed, it is possible to perform an accurate estimation, in which an interference due to the vibration of the resonance frequency c1 of the control system is suppressed.

It is possible to reduce a time period until the estimation completion by simultaneously carrying out the individual estimation processes. In the motor control device according to the fifth embodiment of the present invention, it is possible to realize the vibration-damping control for suppressing the vibrations of the resonance frequency c1 and the resonance frequency c2 of the control system.

In the above explanation, the two vibration-damping frequencies are set in the feedforward control unit 2. However, when two or more vibration-damping frequencies are set, likewise, it is possible to accurately estimate a resonance frequency and a resonance attenuation coefficient of the control system and realize the vibration-damping control. In that case, it is sufficient to increase the number of individual estimation processes according to the number of vibration-damping frequencies to be set and increase vibration-removal-signal computing elements of the signal-for-estimation computing unit 5d and the number of resonance-characteristic estimating computing elements of the resonance-characteristic estimating computing unit 4a according to the increase in the number of individual estimation processes to perform parallel computations.

In the above explanation, the individual estimation processes are realized by inputting the position command signal X*, which is an operation command, a plurality of times. However, it is also possible to store, as waveform data, a waveform of the vibration signal Xe obtained when the position command signal X* is input once and realize the individual estimation processes by using the stored waveform data. In that case, steps S505 and S510 can be omitted from the steps shown in the flowchart of FIG. 19.

In the above explanation, the form process of estimating a resonance frequency and a resonance attenuation coefficient of the control system and setting both of a vibration-damping frequency and a vibration-damping attenuation coefficient of the feedforward control unit 2 is explained. However, although an effect of the vibration-damping control is inferior, a vibration-damping coefficient can be fixed for simplification. In that case, an attenuation coefficient of the control system does not have to be estimated.

In the above explanation, the vibration-removal-signal computing elements 51d and 52d have the transfer characteristic represented by Formula (4). However, to eliminate the influence of noise and offset, a smooth transfer characteristic not having a minimum point where attenuation is a value equal to or smaller than 0.2 or a "zero" of a high-pass filter, a band-pass filter, or the like can be added to the transfer characteristic of Formula (4).

In the above explanation, a signal input to the signal-for-estimation computing unit 5d is a signal based on a signal input to the feedback control unit 3. However, a signal different from the signal input to the feedback control unit 3 can be used. For example, the same operation can be realized using an acceleration signal of the machine system 12 detected by an acceleration sensor attached to the machine system 12.

In the above explanation, the vibration-damping control is realized by performing the computation for reducing a signal component of a resonance frequency of the control system to the input of the position command signal X* in the feedforward control unit 2. However, a unit for performing computation for shaping the position command signal X* to prevent a vibration from appearing in the position signal Xm can be provided instead of the feedforward control unit 2.

INDUSTRIAL APPLICABILITY

As explained above, the motor control device according to the present invention is suitable for driving of a controlled object in which residual vibration in which a plurality of vibration frequencies is superimposed occurs.

REFERENCE SIGNS LIST 1 controlled object
2 feedforward control unit
3 feedback control unit
4, 4a resonance-characteristic estimating computing units
41, 41a, 42a resonance-characteristic estimating computing elements
5, 5a, 5b, 5c, 5d signal-for-estimation computing units
51, 52a, 52a resonance-signal computing elements
51b signal-for-estimation computing element
51c, 51d, 52d vibration-removal-signal computing elements
6 subtracter
7 vibration-damping-control setting unit
11 motor
12 machine system
13 position detector

The invention claimed is:

1. A motor control device comprising:
a feedforward control unit configured to compute a feedforward signal according to an input operation command to reduce signal components at a set plurality of vibration-damping frequencies;
a driving-command computing unit configured to compute, using the feedforward signal, a driving command for driving a controlled object;
a vibration-damping-control setting unit configured to designate one of a plurality of candidate frequencies of a vibration-damping frequency;
a signal-for-estimation computing unit configured to output, based on an operation signal equivalent to a value of a position, speed, or acceleration related to the controlled object, a signal for estimation in which the signal components of the other candidate frequencies excluding the designated one candidate frequency among the candidate frequencies are reduced from a vibration component of a control system including the controlled object; and
a resonance-characteristic estimating unit configured to estimate one resonance frequency from the output signal for estimation, wherein
the vibration-damping-control setting unit designates each of the candidate frequencies individually as one candidate frequency, sets the feedforward control unit and the signal-for-estimation computing unit such that the signal-for-estimation computing unit outputs the signal for estimation in which the signal components of the other candidate frequencies excluding the designated one candidate frequency, and sets, as the vibration-damping frequency of the feedforward control unit, each of resonance frequencies estimated by the resonance-characteristic estimating unit related to the individually designated each one candidate frequency.

2. The motor control device according to claim 1, wherein the vibration-damping-control setting unit updates the designated one candidate frequency with the resonance frequency related to the one candidate frequency estimated by the resonance-characteristic estimating unit, executes, a predetermined number of times or until each of the plurality of candidate frequencies converges, the designation and the update applied to each of the plurality of candidate frequencies a number of times equal to or more than one time, and sets the plurality of candidate frequencies after the predetermined number of times of execution or after the convergence as the vibration-damping frequency of the feedforward control unit.

3. The motor control device according to claim 2, wherein, in performing the designation and the update for the plurality of candidate frequencies, after the estimation of the resonance frequency related to the designated one candidate frequency is performed, the vibration-damping-control setting unit designates a same or a next candidate frequency.

4. The motor control device according to claim 2, wherein
the motor control device includes a plurality of the resonance-characteristic estimating units and a plurality of the signal-for-estimation computing units,
in performing the designation and the update for the candidate frequencies, the vibration-damping-control setting unit designates different candidate frequencies in parallel one by one for the respective signal-for-estimation computing units,
the respective signal-for-estimation computing units output signals for estimation in parallel, and
the respective resonance-characteristic estimating units estimate resonance frequencies one by one in parallel from the signals for estimation output by the signal-for-estimation computing units corresponding to the resonance-characteristic estimating units.

5. The motor control device according to claim 2, wherein
the feedforward control unit sets, as the vibration-damping frequency, the plurality of candidate frequencies sequentially updated by the vibration-damping-control setting unit and computes a feedforward signal, and
the signal-for-estimation computing unit increases the signal component of the designated one candidate frequency in a vibration component of an operation signal of the controlled object.

6. The motor control device according to claim 2, wherein
the feedforward control unit computes a feedforward signal without reducing the signal component of any one of the candidate frequencies in response to the operation command until the vibration-damping frequency is set, and
the signal-for-estimation computing unit has, as a transfer characteristic from the operation signal to the signal for estimation, a characteristic that the signal components of the other candidate frequencies are reduced.

7. The motor control device according to claim 2, wherein
the feedforward control unit sets the other candidate frequencies as the vibration-damping frequency and computes the feedforward signal, and
the signal-for-estimation computing unit has a smooth transfer characteristic not having a pole or a zero where attenuation is a value equal to or smaller than a predetermined value from the operation signal to the signal for estimation.

* * * * *